US012703643B2

(12) United States Patent
Yun et al.

(10) Patent No.: US 12,703,643 B2
(45) Date of Patent: Aug. 11, 2026

(54) POSITIVE ELECTRODE ACTIVE MATERIAL, PREPARATION METHOD, POSITIVE ELECTRODE SHEET, SECONDARY BATTERY, AND ELECTRIC DEVICE

(71) Applicant: CONTEMPORARY AMPEREX TECHNOLOGY CO., LIMITED, Ningde (CN)

(72) Inventors: Liang Yun, Ningde (CN); Xin Sun, Ningde (CN); Xingbu Chen, Ningde (CN); Xuan Li, Ningde (CN); Lili Wu, Ningde (CN); Peidong Song, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/241,651

(22) Filed: Jun. 18, 2025

(65) Prior Publication Data

US 2025/0313490 A1 Oct. 9, 2025

Related U.S. Application Data

(63) Continuation of application No. PCT/CN2024/084196, filed on Mar. 27, 2024.

(30) Foreign Application Priority Data

Apr. 27, 2023 (CN) ........................ 202310473119.X

(51) Int. Cl.
*C01G 45/1228* (2025.01)
*H01M 10/0525* (2010.01)

(52) U.S. Cl.
CPC .... *C01G 45/1228* (2013.01); *H01M 10/0525* (2013.01); *C01P 2002/78* (2013.01);
(Continued)

(58) Field of Classification Search
CPC .............................. H01M 4/505; H01M 4/525
See application file for complete search history.

(56) References Cited

U.S. PATENT DOCUMENTS

2009/0029253 A1* 1/2009 Itou .................. H01M 10/0525 429/223
2014/0087265 A1 3/2014 Yura et al.
(Continued)

FOREIGN PATENT DOCUMENTS

CN 107431236 A 12/2017
CN 107768639 A 3/2018
(Continued)

OTHER PUBLICATIONS

International Search Report and Written Opinion mailed on Jul. 1, 2024, received for PCT Application PCT/CN2024/084196, filed on Mar. 27, 2024, 10 pages including English Translation.
(Continued)

*Primary Examiner* — Nathanael T Zemui
(74) *Attorney, Agent, or Firm* — XSENSUS LLP

(57) ABSTRACT

Provided in the present application are a positive electrode active material, a preparation method, a positive electrode sheet, a secondary battery, and an electric device. The positive electrode active material has the following general formula: $Li_aNi_xM1_yMn_zM2_{1-x-y-z}O_2$, where M1 and M2 each independently include one or a plurality of Co, Al, B, Zr, Sr, Y, Sb, W, Ti, Mg, or Nb, $0.8 \leq a \leq 1.2$, $0.55 \leq x < 1$, $0 < y \leq 0.25$, and $0 \leq z \leq 0.2$, the positive electrode active material is present in a form of secondary particles formed by aggregation of primary particles, the secondary particles
(Continued)

include secondary pores formed by spaces between the primary particles, and the secondary pores have an inner diameter of 0.1 μm to 2 μm.

19 Claims, 3 Drawing Sheets

(52) U.S. Cl.
CPC ...... *C01P 2004/61* (2013.01); *C01P 2004/62* (2013.01); *C01P 2006/12* (2013.01); *C01P 2006/16* (2013.01); *C01P 2006/40* (2013.01)

(56) References Cited

U.S. PATENT DOCUMENTS

| | | | | |
|---|---|---|---|---|
| 2019/0260024 | A1* | 8/2019 | Nakamura | C01G 53/82 |
| 2023/0163298 | A1* | 5/2023 | Kim | H01M 10/0525<br>429/223 |
| 2024/0282951 | A1* | 8/2024 | Yoo | H01M 4/131 |

FOREIGN PATENT DOCUMENTS

| | | | |
|---|---|---|---|
| CN | 109983604 | A | 7/2019 |
| CN | 110176587 | A | 8/2019 |
| CN | 114772658 | A | 7/2022 |
| CN | 115020697 | A | 9/2022 |
| CN | 115084508 | A | 9/2022 |
| CN | 115367815 | A | 11/2022 |
| CN | 115863571 | A | 3/2023 |
| EP | 3331065 | A1 | 6/2018 |
| EP | 3333129 | B1 | 10/2020 |
| JP | 2018-085198 | A | 5/2018 |
| JP | 2018-095505 | A | 6/2018 |
| WO | 2022/169270 | A1 | 8/2022 |

OTHER PUBLICATIONS

Notice of Allowance issued Sep. 19, 2025 in Chinese Patent Application No. 202310473119.X with English translation thereof.

Extended European Search Report issued Apr. 23, 2026 in European Patent Application No. 24795744.2.

* cited by examiner

POSITIVE ELECTRODE ACTIVE MATERIAL, PREPARATION METHOD, POSITIVE ELECTRODE SHEET, SECONDARY BATTERY, AND ELECTRIC DEVICE

CROSS-REFERENCE TO RELATED APPLICATIONS

The present application is a continuation of International Patent Application No. PCT/CN2024/084196, filed on Mar. 27, 2024, which makes reference to Chinese Patent Application No. 202310473119.X filed on Apr. 27, 2023 and entitled "Positive Electrode Active Material, Preparation Method Therefor, Positive Electrode Sheet, Secondary Battery, and Electric Device", each are incorporated herein by reference in their entirety.

TECHNICAL FIELD

The present application relates to the technical field of secondary batteries, and in particular, to a positive electrode active material, a preparation method, a positive electrode sheet, a secondary battery, and an electric device.

BACKGROUND

Recently, a secondary battery is widely applied in an energy storage power system, such as a hydraulic, thermal, wind, or solar power plant, and the like, and the fields of a power tool, an electric bicycle, an electric motorcycle, an electric vehicle, military equipment, aerospace, and the like.

The performance of a positive electrode active material directly affects the performance of the secondary battery. At present, the positive electrode active material has many defects, which cannot meet an application need of a new generation electrochemical system.

SUMMARY

The present application has been made in view of the above problems, and an object thereof is to provide a positive electrode active material in which secondary particles include secondary pores formed by spaces between primary particles, and the secondary pores have an inner diameter of 0.1 μm to 2 μm, which is advantageous to improve the cycle performance of a battery of the positive electrode active material.

A first aspect of the present application provides a positive electrode active material, and the positive electrode active material has the following general formula:

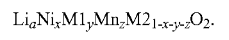

$$Li_aNi_xM1_yMn_zM2_{1-x-y-z}O_2.$$

M1 and M2 each independently comprise one or a plurality of Co, Al, B, Zr, Sr, Y, Sb, W, Ti, Mg, or Nb, $0.8 \le a \le 1.2$, $0.55 \le x < 1$, $0 < y \le 0.25$, and $0 \le z \le 0.2$.

The positive electrode active material is present in a form of secondary particles formed by aggregation of primary particles, the secondary particles comprise secondary pores formed by spaces between the primary particles, and the secondary pores have an inner diameter of 0.1 μm to 2 μm.

In one aspect, the secondary particles comprise the secondary pores formed by the spaces between the primary particles, so that the positive electrode active material has a three-dimensional channel, a solid-phase mass transfer path of lithium ions is shortened, and the power performance of a battery is improved. In another aspect, due to the presence of the secondary pores, more (010) crystal planes can be exposed, resulting in more reactive active sites, increasing the capacity per gram and the energy density of the material. In addition, the presence of the secondary pores may also buffer a volume change of the positive electrode active material during charging and discharging, thereby stabilizing the structure and improving the cycle performance. Moreover, the inner diameter of the secondary pore is controlled to be 0.1 μm to 2 μm, so that the energy density and the cycle performance of the battery can be greatly improved, and the performance of the battery can be comprehensively improved.

In any embodiment, the ratio of the closest distance between the secondary pores and the surface of the secondary particles to the Dv50 of the secondary particles is 1/5 to 3/5, and is optionally 3/10 to 1/2.

Controlling the ratio of the closest distance between the secondary pores and the surface of the secondary particles to the Dv50 of the secondary particles to be within an appropriate range can not only improve the power performance of the battery but also reduce the influence of the presence of the pores on the structure of the positive electrode active material.

In any embodiment, at least some of the primary particles further comprise primary pores therein, and the primary pores have an inner diameter of 0.05 μm to 0.6 μm, optionally 0.08 μm to 0.2 μm.

The presence of the primary pores is advantageous to further shorten the solid-phase mass transfer path of the lithium ions, thereby improving the power performance of the battery. The inner diameter of the primary pore is controlled to be within an appropriate range, so that both the power performance and the energy density of the battery can be considered.

In any embodiment, $0.8 \le a \le 1.2$, $0.8 \le x < 1.0$, $0 < y \le 0.1$, and $0 \le z \le 0.1$, and optionally, $0.8 \le a \le 1.2$, $0.85 \le x \le 0.96$, $0 < y \le 0.02$, and $0 \le z \le 0.05$.

In any embodiment, the secondary pores have an inner diameter of 0.2 μm to 1 μm.

Further controlling the inner diameter of the secondary pore to 0.2 μm to 1 μm is advantageous to further improve the energy density and the cycle performance of the battery.

In any embodiment, the porosity of the positive electrode active material is 0.1% to 12%, and is optionally 0.1% to 10%.

Controlling the porosity of the positive electrode active material to be within an appropriate range can both provide enough space to expose more (010) crystal planes to generate more reactive active sites and increase the energy density of the battery, and have enough mechanical strength to reduce the risk of crushing the positive electrode active material during preparation. Therefore, both the electrical performance and the mechanical strength of the battery are considered.

In any embodiment, the average particle size of the primary particles is 100 nm to 800 nm, and is optionally 100 nm to 500 nm.

The average particle size D of the primary particles is controlled to be within an appropriate range, so that the battery has high energy density and excellent power performance and cycle performance, and the electrochemical performance of the battery is comprehensively improved.

In any embodiment, the Dv50 of the secondary particles is 3 μm to 12 μm, and is optionally 3 μm to 11 μm.

The Dv50 of the secondary particles is controlled to be within an appropriate range, so that the battery has high energy density and excellent power performance and cycle performance, and the electrochemical performance of the battery is comprehensively improved.

In any embodiment, the SPAN value of the secondary particles is 0.8 to 1.5, and is optionally 0.8 to 1.3.

The SPAN value of the secondary particles is controlled to be within an appropriate range, so that the battery has high energy density and excellent power performance and cycle performance, and the electrochemical performance of the battery is comprehensively improved.

In any embodiment, the area of a (010) crystal plane in an XRD diffraction spectrum of the positive electrode active material is 200 $\mu m^2$ to 300 $\mu m^2$, and is optionally 250 $\mu m^2$ to 280 $\mu m^2$.

The area of the (010) crystal plane in the XRD diffraction spectrum of the positive electrode active material is controlled to be within an appropriate range, to provide a sufficient number of reactive active sites, increase the energy density of the battery, and improve the electrochemical performance of the battery.

A second aspect of the present application provides a preparation method for a positive electrode active material, comprising:

- mixing a first raw material comprising a nickel source and a manganese source with a complexing agent and a precipitating agent to perform a co-precipitation reaction to prepare a precursor, optionally, the first raw material further comprising an M1 source; and
- mixing the precursor with a lithium source for calcination to prepare the positive electrode active material; or
- mixing the precursor with a lithium source for calcination and then performing mixing with an M2 source for calcination to prepare the positive electrode active material.

The positive electrode active material has the following general formula:

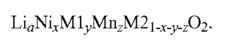

$$Li_aNi_xM1_yMn_zM2_{1-x-y-z}O_2.$$

M1 and M2 each independently comprise one or a plurality of Co, Al, B, Zr, Sr, Y, Sb, W, Ti, Mg, or Nb, $0.8 \le a \le 1.2$, $0.55 \le x < 1$, $0 < y \le 0.25$, and $0 \le z \le 0.2$, the positive electrode active material is present in a form of secondary particles formed by aggregation of primary particles, the secondary particles comprise secondary pores formed by spaces between the primary particles, and the secondary pores have an inner diameter of 0.1 μm to 2 μm.

By the co-precipitation reaction and the control of the amount of the manganese source, the prepared precursor has a plurality of pores distributed in a ring shape, and therefore the positive electrode active material comprising the secondary pores distributed between the primary particles is obtained. The preparation method for the positive electrode active material is simple, and has low manufacturing costs. The secondary pores in the prepared positive electrode active material have an inner diameter of 0.1 μm to 2 μm, which facilitates the insertion and extraction of lithium ions. In addition, the secondary pores can buffer a volume change of the positive electrode active material during charging and discharging, thereby stabilizing the structure and improving the cycle performance.

In any embodiment, $0.8 < a \le 1.2$, $0.8 \le x < 1.0$, $0 < y \le 0.1$, and $0 \le z \le 0.1$, and optionally, $0.8 \le a \le 1.2$, $0.85 \le x \le 0.96$, $0 < y \le 0.02$, and $0 \le z \le 0.05$.

In any embodiment, the precursor is secondary precursor particles formed by aggregation of primary precursor particles.

The average particle size D' of the primary precursor particles is 150 nm to 500 nm, and is optionally 200 nm to 300 nm.

The median particle size Dv50' of the secondary precursor particles is 3 μm to 12 μm, and is optionally 6 μm to 8 μm.

The average particle size D' of the primary precursor particles and the median particle size Dv50' of the secondary precursor particles are controlled to be within an appropriate range to control the sizes of the primary particles and the secondary particles of the prepared positive electrode active material to be within an appropriate range, so that a battery has high energy density and excellent cycle performance.

In any embodiment, the specific surface area of the precursor is 2 $m^2/g$ to 40 $m^2/g$, and is optionally 25 $m^2/g$ to 35 $m^2/g$.

The specific surface area of the precursor is controlled to be within an appropriate range to control the positive electrode active material to have an appropriate porosity, so that the battery has high energy density and excellent discharge performance and cycle performance.

In any embodiment, the molar concentration of the manganese element in the first raw material is 0.02 mol/L to 1.5 mol/L, and is optionally 0.05 mol/L to 1.2 mol/L.

The molar concentration of the manganese element in the first raw material is controlled to be within an appropriate range to control the inner diameter of the pore in the positive electrode active material to be within an appropriate range, so that the battery has high energy density and excellent discharge performance and cycle performance.

In any embodiment, the pH value of the co-precipitation reaction is 9 to 12, and is optionally 9 to 11.

In any embodiment, the reaction temperature of the co-precipitation reaction is 50° C. to 80° C., and is optionally 55° C. to 75° C.

In any embodiment, the reaction time of the co-precipitation reaction is 6 h to 10 h, and is optionally 6.5 h to 9.5 h.

In any embodiment, the stirring speed of the co-precipitation reaction is 200 rmp to 500 rmp, and is optionally 230 rmp to 300 rmp.

Controlling the pH value, the reaction temperature, the reaction time, and the stirring speed of the co-precipitation reaction to be within an appropriate range allows the co-precipitation reaction to proceed more smoothly and more efficiently, and helps the formed pores to be distributed in a ring shape inside the primary particles of the positive electrode active material. In addition, the pores have an appropriate inner diameter, so that the battery has high energy density and excellent discharge performance and cycle performance.

A third aspect of the present application provides a positive electrode sheet. The positive electrode sheet comprises a positive electrode current collector and a positive electrode film layer disposed on at least one surface of the positive electrode current collector. The positive electrode film layer comprises the positive electrode active material according to the first aspect of the present application or the positive electrode active material prepared by adopting the preparation method according to the second aspect of the present application.

In any embodiment, the thickness of the positive electrode film layer is 200 μm to 400 μm, and is optionally 200 μm to 300 μm.

Controlling the thickness of the positive electrode film layer to be within an appropriate range can not only provide a sufficient amount of positive electrode active material to improve the energy density of the battery, but also reduce the influence on the solid-phase mass transfer of lithium ions. Therefore, both the energy density and the power performance of the battery are considered.

A fourth aspect of the present application provides a secondary battery, comprising the positive electrode sheet according to the third aspect.

A fifth aspect of the present application provides an electric device, comprising the secondary battery according to the fourth aspect.

DESCRIPTION OF REFERENCE SIGNS

Figure 1:
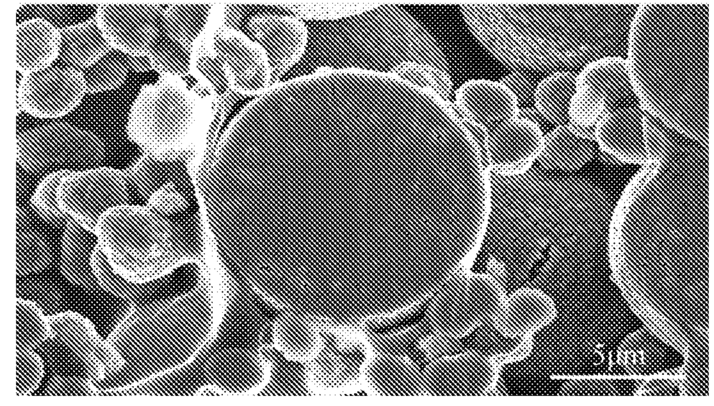
FIG. 1 shows a scanning electron microscope image of a positive electrode active material shown in Example 3 of the present application.

1—battery pack; 2—upper case; 3—lower case; 4—battery module; 5—secondary battery; 51—housing; 52—electrode assembly; 53—cover plate.

DESCRIPTION OF EMBODIMENTS

Embodiments specifically disclosing a positive electrode active material, a preparation method, a positive electrode sheet, a secondary battery, and an electric device in the present application will be described below in detail with appropriate reference to the accompanying drawings. However, an unnecessary detailed description may be omitted. For example, a detailed description of well-known matters and repeated descriptions of a substantially same structure may be omitted. This is to avoid the following descriptions from becoming unnecessarily redundant and to facilitate understanding by those skilled in the art. The accompanying drawings and the following descriptions are provided for those skilled in the art to fully understand this application, and are not intended to limit subject matters described in the claims.

The "range" disclosed in this application is limited in the form of a lower limit and an upper limit. A given range is limited by selecting a lower limit and an upper limit, which define the boundaries of the specific range. A range defined in this manner may include an end value or may not include an end value, and may be any combination, that is, any lower limit may be combined with any upper limit to form a range. For example, if the ranges of 60-120 and 80-110 are listed for a specific parameter, it is understood that the ranges of 60-110 and 80-120 are also expected. In addition, if the minimum range values of 1 and 2 are listed, and if the maximum range values of 3, 4, and 5 are listed, the following ranges may all be expected: 1-3, 1-4, 1-5, 2-3, 2-4, and 2-5. In this application, unless otherwise stated, a numerical range "a-b" represents a shorthand representation for a combination of any real numbers between a and b, where both a and b are real numbers. For example, the numerical range of "0-5" represents that all real numbers between "0-5" have been listed herein, and "0-5" is only a shortened representation of these numerical combinations. In addition, when a parameter is expressed as an integer ≥2, it is equivalent to disclosing that the parameter is an integer such as 2, 3, 4, 5, 6, 7, 8, 9, 10, 11, or 12.

Unless otherwise specified, all embodiments and optional embodiments of this application may be combined with each other to form new technical solutions.

Unless otherwise specified, all technical features and optional technical features of this application can be combined with each other to form new technical solutions.

Unless otherwise specified, all steps in this application may be performed sequentially or randomly, preferably sequentially. For example, the method includes steps (a) and (b), which indicates that the method may include sequentially performed steps (a) and (b) or may include sequentially performed steps (b) and (a). For example, the mentioned method may further include step (c), which indicates that step (c) may be added to the method in any order, for example, the method may include steps (a), (b), and (c), may include steps (a), (c), and (b), may include steps (c), (a) and (b), or the like.

Unless otherwise specified, the terms "including" and "containing" as used herein are meant to be open or closed. For example, the "including" and "containing" may mean that other components not listed may be further included or contained, or only the listed components may be included or contained.

In this application, the term "or" is inclusive, unless specifically stated otherwise. For example, the phrase "A or B" means "A, B, or both A and B". More specifically, the condition "A or B" is satisfied by either A being true (or present) and B being false (or absent), A being false (or absent) and B being true (or present), or both A and B being true (or present).

At present, ternary materials in the field of lithium batteries become one of hot positive electrode active materials of secondary batteries due to high theoretical specific capacities, high discharge plateaus, and low costs of the ternary materials. However, for a common ternary material, the particle size of the ternary material prepared is too large or too small due to limitations of a preparation method and structure, for example, the process stability of preparing a precursor of the ternary material using a carbonate as a precipitating agent is poor, and the solid structure of the ternary material limits the solid-phase mass transfer of metal ions. As a result, the ternary material cannot satisfy both the energy density and the power performance. Therefore, there is a need to design a positive electrode active material that can achieve both the battery cycle performance and the power performance, to meet an application need of a new generation electrochemical system.

[Positive Electrode Active Material]

Based on this, the present application provides a positive electrode active material having the following general formula:

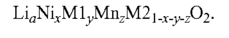

M1 and M2 each independently include one or a plurality of Co, Al, B, Zr, Sr, Y, Sb, W, Ti, Mg, or Nb, $0.8 \le a \le 1.2$, $0.55 \le x < 1$, $0 < y \le 0.45$, $0 < y \le 0.25$, and $0 \le z \le 0.2$.

The positive electrode active material is present in a form of secondary particles formed by aggregation of primary particles, the secondary particles include secondary pores formed by spaces between the primary particles, and the secondary pores have an inner diameter of 0.1 μm to 2 μm.

Herein, the term "primary particles" refers to particles of the positive electrode active material before agglomeration.

Herein, the term "secondary pores" refers to cavity structures between the primary particles of the positive electrode active material.

Herein, the term "inner diameter of the secondary pore" refers to the longest straight-line distance between any two points on the circumference of a single cavity between the primary particles of the positive electrode active material.

As used herein, the inner diameter of a pore can be tested by any means known in the art. As an example, a conductive adhesive was attached to a sample stage, a powdery sample of the positive electrode active material was spread on the conductive adhesive, non-adhered powder was blown off with an ear washing ball, gold was sprayed, and a cross section of a particle of the powdery sample was cut using argon plasma. A scanning electron microscope was used to obtain a scanning electron microscope photo of the powdery sample under conditions of an acceleration voltage of 10 kV and an emission current of 10 mA. The inner diameter size of the secondary pore was measured according to the scanning electron microscope photo, at least three samples were measured, data of at least 50 primary particles was measured for each sample, and an average value of the data was taken as the inner diameter size of the secondary pore of the sample.

In some embodiments, in the chemical formula $Li_aNi_xM1_yMn_zM2_{1-x-y-z}O_2$, a is any value of 0.8, 0.9, 1.0, 1.1, or 1.2, or a range formed by any two values therein.

In some embodiments, in the chemical formula $Li_aNi_xM1_yMn_zM2_{1-x-y-z}O_2$, x is any value of 0.56, 0.6, 0.7, 0.8, 0.9, 0.95, 0.995, or 1, or a range formed by any two values therein.

In some embodiments, in the chemical formula $Li_aNi_xM1_yMn_zM2_{1-x-y-z}O_2$, y is any value of 0.01, 0.1, 0.15, 0.2, 0.22, or 0.25, or a range formed by any two values therein.

In some embodiments, in the chemical formula $Li_aNi_xM1_yMn_zM2_{1-x-y-z}O_2$, z is any value of 0, 0.1, 0.12, 0.15, 0.17, or 0.2, or a range formed by any two values therein.

In some embodiments, in the chemical formula $Li_aNi_xM1_yMn_zM2_{1-x-y-z}O_2$, $0.8 \le a \le 1.2$, $0.90 \le x \le 1.0$, and $0 \le y \le 0.1$.

In some embodiments, in the chemical formula $Li_aNi_xM1_yMn_zM2_{1-x-y-z}O_2$, $0.8 \le a \le 1.2$, $0.8 \le x < 1.0$, $0 < y \le 0.1$, and $0 \le z \le 0.1$.

In some embodiments, in the chemical formula $Li_aNi_xM1_yMn_zM2_{1-x-y-z}O_2$, $0.8 \le a \le 1.2$, $0.85 \le x \le 0.96$, $0 < y \le 0.02$, and $0 \le z \le 0.05$.

In some embodiments, the positive electrode active material has a chemical formula $Li_aNi_xCo_yMn_zM2_{1-x-y-z}O_2$ in which $0.8 \le a \le 1.2$, $0.85 \le x \le 0.96$, $0 < y \le 0.02$, and $0 \le z \le 0.05$.

In some embodiments, the positive electrode active material has a chemical formula $Li_aNi_xAl_yMn_zM2_{1-x-y-z}O_2$ in which $0.8 \le a \le 1.2$, $0.85 \le x \le 0.96$, $0 < y \le 0.02$, and $0 \le z \le 0.05$.

The use of the above materials can ensure a high capacity per gram of the positive electrode active material, so that a battery has a high discharge capacity and energy density.

In some embodiments, the inner diameter of the secondary pore may be selected as 0.1 μm, 0.2 μm, 0.4 μm, 0.5 μm, 0.6 μm, 0.8 μm, 1 μm, 1.2 μm, 1.4 μm, 1.5 μm, 1.6 μm, 1.8 μm, 2 μm, or a value in a range consisting of any two of the above points.

It may be understood that the secondary pores are located between the primary particles and are distributed on an inner side near the surface of the secondary particles. The secondary pores are uniformly distributed inside the secondary particles, and the distribution of the secondary pores is in a shape of a spherical shell, and in a cross section passing through the center of gravity of the secondary particles, the secondary pores may form a circle and distributed in a shape of a ring inside the secondary particles.

In one aspect, the secondary particles include the secondary pores formed by the spaces between the primary particles, so that the positive electrode active material has a three-dimensional channel, a solid-phase mass transfer path of lithium ions is shortened, and the power performance of the battery is improved. In another aspect, due to the presence of the secondary pores, more (010) crystal planes can be exposed, resulting in more reactive active sites, increasing the capacity per gram and the energy density of the material. In addition, the presence of the secondary pores may also buffer a volume change of the positive electrode active material during charging and discharging, thereby stabilizing the structure and improving the cycle performance. Moreover, the inner diameter of the secondary pore is controlled to be 0.1 μm to 2 μm, so that the energy density and the cycle performance of the battery can be greatly improved, and the performance of the battery can be comprehensively improved.

In some embodiments, the ratio of the closest distance between the secondary pores and the surface of the secondary particles to the Dv50 of the secondary particles is 1/5 to 3/5. In some embodiments, the ratio of the closest distance between the secondary pores and the surface of the secondary particles to the Dv50 of the secondary particles is 3/10 to 1/2. In some embodiments, the ratio of the closest distance between the secondary pores and the surface of the secondary particles to the Dv50 of the secondary particles is 1/5, 3/10, 2/5, 1/2, 3/5, or a value in a range formed by any two of the above points.

Controlling the ratio of the closest distance between the secondary pores and the surface of the secondary particles to the Dv50 of the secondary particles to be within an appropriate range can not only improve the power performance of the battery but also reduce the influence of the presence of the pores on the structure of the positive electrode active material.

In some embodiments, at least some of the primary particles further include primary pores therein, and the primary pores have an inner diameter of 0.05 μm to 0.6 μm. In some embodiments, the primary pores have an inner diameter of 0.08 μm to 0.2 μm. In some embodiments, the inner diameter of the primary pore may be selected as 0.05 μm, 0.06 μm, 0.08 μm, 0.1 μm, 0.15 μm, 0.2 μm, 0.25 μm, 0.3 μm, 0.35 μm, 0.4 μm, 0.45 μm, 0.5 μm, 0.45 μm, 0.6 μm, or a value in a range formed by any two of the above points.

Herein, the term "primary pores" refers to cavity structures present inside the primary particles of the positive electrode active material.

Herein, the term "inner diameter of the primary pore" refers to the longest straight-line distance between any two points on the circumference of a single cavity inside the primary particles of the positive electrode active material.

The presence of the primary pores is advantageous to further shorten the solid-phase mass transfer path of the lithium ions, thereby improving the power performance of the battery. The inner diameter of the primary pore is controlled to be within an appropriate range, so that both the power performance and the energy density of the battery can be considered.

As used herein, the inner diameter of a pore can be tested by any means known in the art. As an example, a conductive adhesive was attached to a sample stage, a powdery sample of the positive electrode active material was spread on the conductive adhesive, non-adhered powder was blown off with an ear washing ball, gold was sprayed, and a cross section of a particle of the powdery sample was cut using argon plasma. A transmission electron microscope was used to obtain a scanning electron microscope photo of the powdery sample under conditions of an acceleration voltage of 100 kV and an emission current of 100 mA. The inner diameter size of the primary pore was measured according to the scanning electron microscope photo, at least three samples were measured, data of at least 50 primary particles was measured for each sample, and an average value of the data was taken as the inner diameter size of the primary pore of the sample.

In some embodiments, the inner diameter of the secondary pore is 0.2 μm to 1 μm. In some embodiments, the inner diameter of the secondary pore may be selected as 0.2 μm, 0.3 μm, 0.4 μm, 0.5 μm, 0.6 μm, 0.7 μm, 0.8 μm, 0.9 μm, 1 μm, or a value in a range formed by any two of the above points.

Further controlling the inner diameter of the secondary pore to 0.2 μm to 1 μm is advantageous to further improve the energy density and the cycle performance of the battery.

In some embodiments, the porosity of the positive electrode active material is 0.1% to 12%. In some embodiments, the porosity of the positive electrode active material is 0.1% to 10%. In some embodiments, the porosity of the positive electrode active material may be selected as 0.1%, 0.5%, 1%, 2%, 3%, 4%, 5%, 6%, 7%, 8%, 9%, 10%, 11%, 12%, or a value in a range formed by any two of the above points.

Herein, the "porosity" refers to the ratio of the pore volume in the positive electrode active material to the total volume of the positive electrode active material.

Herein, the porosity of the positive electrode active material may be tested by any means known in the art. As an example, according to GB/T 24586, the gas displacement method was used for measurement. Porosity=$(V1-V2)/V1\times 100\%$, where V1 is the apparent volume of the sample and V2 is the true volume of the sample.

Controlling the porosity of the positive electrode active material to be within an appropriate range can both provide enough space to expose more (010) crystal planes to generate more reactive active sites and increase the energy density of the battery, and have enough mechanical strength to reduce the risk of crushing the positive electrode active material during preparation. Therefore, both the electrical performance and the mechanical strength of the battery are considered.

In some embodiments, the average particle size D of the primary particles is 100 nm to 800 nm. In some embodiments, the average particle size D of the primary particles is 100 nm to 500 nm. In some embodiments, the average particle size D of the primary particles may be selected as 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, or a value in a range formed by any two of the above points.

Herein, the average particle size D of the primary particles may be tested by any means known in the art. As an example, after imaging was performed by a scanning electron microscope (ZEISS Sigma-02-33, Germany) at a magnification of 500, 200 to 600 primary particles of the positive electrode active material that have a complete shape and no shade were randomly selected from an electron microscopic image of the scanning electron microscope, the longest diameters of pores in the primary particles in the microscopic image were recorded, and an average value of the longest diameters was taken as the average particle size D.

In some embodiments, the Dv50 of the secondary particles is 3 μm to 12 μm. In some embodiments, the Dv50 of the secondary particles is 3 μm to 11 μm. In some embodiments, the Dv50 of the secondary particles may be selected as 3 μm, 4 μm, 5 μm, 6 μm, 7 μm, 8 μm, 9 μm, 10 μm, 11 μm, 12 μm, or a value in a range formed by any two of the above points.

Herein, the Dv50 of the secondary particles may be tested by any means known in the art. As an example, referring to the particle size distribution laser diffraction method of GB/T 19077-2016, 0.1 g to 0.13 g of positive electrode active material samples to be tested were weighed in a 50 mL beaker, 5 g of anhydrous ethanol was added, a stirring bar of about 2.5 mm was placed, and then the breaker was sealed with a plastic wrap. The samples were sonicated for 5 min and then transferred to a magnetic stirrer and stirred at 500 rpm for more than 20 min. For each batch, two samples were selected for testing. The test was carried out using a Mastersizer Model 2000E laser particle size analyzer from Malvern Instruments Ltd., UK. The Dv50 is a particle size corresponding to a cumulative volume distribution percentage of the secondary particles of the positive electrode active material reaching 50%.

In some embodiments, the SPAN value of the secondary particles is 0.8 to 1.5. In some embodiments, the SPAN value of the secondary particles is 0.8 to 1.3. In some embodiments, the SPAN value of the secondary particles may be selected as 0.8, 0.9, 1.0, 1.1, 1.2, 1.3, 1.4, 1.5, or a value in a range formed by any two of the above points.

Herein, the term "SPAN" refers to the distribution span, and a calculation manner of the SPAN is $(Dv90-Dv10)/Dv50$, which represents the particle distribution of the positive electrode active material.

Herein, the SPAN value of the secondary particles may be tested by any means known in the art. As an example, the Dv50 test of the secondary particles of the positive electrode active material is as follows: Referring to the particle size distribution laser diffraction method of GB/T 19077-2016, 0.1 g to 0.13 g of positive electrode active material samples to be tested were weighed in a 50 ml beaker, 5 g of anhydrous ethanol was added, a stirring bar of about 2.5 mm was placed, and then the breaker was sealed with a plastic wrap. The samples were sonicated for 5 min and then transferred to a magnetic stirrer and stirred at 500 rpm for more than 20 min. For each batch, two samples were selected for testing. The test was carried out using a Mastersizer Model 2000E laser particle size analyzer from Malvern Instruments Ltd., UK. The Dv90 was a particle size corresponding to a cumulative volume distribution percentage of the secondary particles of the positive electrode active material reaching 90%, the Dv50 was a particle size corresponding to a cumulative volume distribution percentage of the secondary particles of the positive electrode active material reaching 50%, and the Dv10 was a particle size corresponding to a cumulative volume distribution percentage of the secondary particles of the positive electrode active material reaching 10%. SPAN=(Dv90−Dv10)/Dv50.

The average particle size D of the primary particles, the Dv50 of the secondary particles, and the SPAN value of the secondary particles are important parameters of the positive electrode active material, and influence the structural performance of the positive electrode active material. Controlling the average particle size D of the primary particles, the Dv50 of the secondary particles, and the SPAN value of the secondary particles to be within an appropriate range facilitates an increase in the tap density of the positive electrode active material, so that the battery has high energy density and excellent power performance and cycle performance, thereby comprehensively improving the electrochemical performance of the battery.

In some embodiments, the area of a (010) crystal plane in an XRD diffraction spectrum of the positive electrode active material is 200 $\mu m^2$ to 300 $\mu m^2$. In some embodiments, the area of the (010) crystal plane in the XRD diffraction spectrum of the positive electrode active material is 250 $\mu m^2$ to 280 $\mu m^2$. In some embodiments, the area of the (010) crystal plane in the XRD diffraction spectrum of the positive electrode active material may be selected as 200 $\mu m^2$, 210 $\mu m^2$, 220 $\mu m^2$, 230 $\mu m^2$, 240 $\mu m^2$, 250 $\mu m^2$, 260 $\mu m^2$, 270 $\mu m^2$, 280 $\mu m^2$, 290 $\mu m^2$, 300 $\mu m^2$, or a value in a range formed by any two of the above points.

Herein, the area of the (010) crystal plane in the XRD diffraction spectrum of the positive electrode active material may be tested by any means known in the art. As an example, the area of the (010) crystal plane was tested using an X-ray powder diffractometer (XRD, instrument model: Bruker D8 ADVANCE) with a target material of Cu Kα, a voltage and current of 40 KV/40 mA, a scanning angle range of 5° to 80°, a scanning step of 0.00836°, and time of 0.3 s per step.

The area of the (010) crystal plane in the XRD diffraction spectrum of the positive electrode active material is controlled to be within an appropriate range, to provide a sufficient number of reactive active sites, increase the energy density of the battery, and improve the electrochemical performance of the battery.

In some embodiments, the capacity per gram of the positive electrode active material is 238 mAh/g to 250 mAh/g.

A positive electrode active material having a high capacity per gram contributes to an increase in the energy density.

The present application further provides a preparation method for a positive electrode active material, including:

- mixing a first raw material including a nickel source and a manganese source with a complexing agent and a precipitating agent to perform a co-precipitation reaction to prepare a precursor, optionally, the first raw material further including an M1 source; and
- mixing the precursor with a lithium source for calcination to prepare the positive electrode active material; or
- mixing the precursor with a lithium source for calcination and then performing mixing with an M2 source for calcination to prepare the positive electrode active material.

The positive electrode active material has the following general formula:

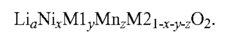

$$Li_aNi_xM1_yMn_zM2_{1-x-y-z}O_2.$$

M1 and M2 each independently include one or a plurality of Co, Al, B, Zr, Sr, Y, Sb, W, Ti, Mg, or Nb, 0.8≤a≤1.2, 0.55≤x<1, 0<y≤0.25, and 0≤z≤0.2, the positive electrode active material is present in a form of secondary particles formed by aggregation of primary particles, the secondary particles include secondary pores formed by spaces between the primary particles, and the secondary pores have an inner diameter of 0.1 μm to 2 μm.

As used herein, the term "co-precipitation reaction" refers to a precipitation reaction of a metal solution, a precipitating agent, and a complexing agent together at a certain temperature.

In some embodiments, the M1 source includes one or a plurality of a cobalt source, an aluminum source, a boron source, an antimony source, a titanium source, or a magnesium source.

In some embodiments, the M2 source includes one or a plurality of a cobalt source, an aluminum source, a boron source, an antimony source, a titanium source, or a magnesium source.

In some embodiments, the nickel source includes one or a plurality of nickel sulfate, nickel hydrochloride, nickel nitrate, or nickel acetate.

In some embodiments, the manganese source includes one or a plurality of manganese sulfate, manganese hydrochloride, manganese nitrate, or manganese acetate.

In some embodiments, the lithium source includes one or a plurality of lithium hydroxide, lithium carbonate, lithium oxide, lithium phosphate, lithium dihydrogen phosphate, or lithium acetate.

In some embodiments, the cobalt source includes one or a plurality of cobalt sulfate, cobalt hydrochloride, cobalt nitrate, or cobalt acetate.

In some embodiments, the antimony source includes one or a plurality of antimony sulfate, antimony hydrochloride, antimony nitrate, or antimony acetate.

By the co-precipitation reaction and the control of the amount of the manganese source, the prepared precursor has a plurality of pores distributed in a ring shape, and therefore the positive electrode active material including the secondary pores distributed between the primary particles is obtained. The preparation method for the positive electrode active material is simple, and has low manufacturing costs. The secondary pores in the prepared positive electrode active material have an inner diameter of 0.1 μm to 2 μm, which facilitates the insertion and extraction of lithium ions. In addition, the pores can buffer a volume change of the positive electrode active material during charging and discharging, thereby stabilizing the structure and improving the cycle performance.

In some embodiments, 0.8≤a≤1.2, 0.8≤x<1.0, 0<y≤0.1, and 0≤z≤0.1.

In some embodiments, 0.8≤a≤1.2, 0.85≤x≤0.96, 0<y≤0.02, and 0≤z≤0.05.

In some embodiments, the precursor is secondary precursor particles formed by aggregation of primary precursor particles.

In some embodiments, the average particle size D' of the primary precursor particles is 150 nm to 500 nm. In some embodiments, the average particle size D' of the primary precursor particles is 200 nm to 300 nm.

In some embodiments, the median particle size Dv50' of the secondary precursor particles is 3 μm to 12 μm. In some embodiments, the median particle size Dv50' of the secondary precursor particles is 6 μm to 8 μm.

In some embodiments, the average particle size D' of the primary precursor particles may be selected as 150 nm, 200 nm, 250 nm, 300 nm, 350 nm, 400 nm, 450 nm, 500 nm, or a value in a range formed by any two of the above points. In some embodiments, the median particle size Dv50' of the secondary precursor particles may be selected as 3 μm, 4 μm, 5 μm, 6 μm, 7 μm, 8 μm, 9 μm, 10 μm, 11 μm, 12 μm, or a value in a range formed by any two of the above points.

Herein, the average particle size D' of the primary precursor particles may be tested by any means known in the art. As an example, after imaging was performed by a scanning electron microscope (ZEISS Sigma-02-33, Germany) at a magnification of 500, 200 to 600 primary precursor particles that have a complete shape and no shade were randomly selected from an electron microscopic image of the scanning electron microscope, the longest diameters of pores in the primary precursor particles in the microscopic image were recorded, and an average value of the longest diameters was taken as the average particle size D'.

Herein, the median particle size Dv50' of the secondary precursor particles may be tested by any means known in the art. As an example, referring to the particle size distribution laser diffraction method of GB/T 19077-2016, 0.1 g to 0.13 g of secondary precursor particles to be tested were weighed in a 50 mL beaker, 5 g of anhydrous ethanol was added, a stirring bar of about 2.5 mm was placed, and then the breaker was sealed with a plastic wrap. Samples were sonicated for 5 min and then transferred to a magnetic stirrer and stirred at 500 rpm for more than 20 min. For each batch, two samples were selected for testing. The test was carried out using a Mastersizer Model 2000E laser particle size analyzer from Malvern Instruments Ltd., UK. The Dv50' is a particle size corresponding to a cumulative volume distribution percentage of the secondary precursor particles reaching 50%.

The average particle size D' of the primary precursor particles and the median particle size Dv50' of the secondary precursor particles are controlled to be within an appropriate range to control the sizes of the primary particles and the secondary particles of the prepared positive electrode active material to be within an appropriate range, so that a battery has high energy density and excellent cycle performance.

In some implementations, the specific surface area of the precursor is 2 $m^2/g$ to 40 $m^2/g$. In some implementations, the specific surface area of the precursor is 25 $m^2/g$ to 35 $m^2/g$. In some embodiments, the specific surface area of the precursor may be selected as 2 $m^2/g$, 5 $m^2/g$, 10 $m^2/g$, 12 $m^2/g$, 15 $m^2/g$, 16 $m^2/g$, 17 $m^2/g$, 18 $m^2/g$, 19 $m^2/g$, 20 $m^2/g$, 21 $m^2/g$, 22 $m^2/g$, 23 $m^2/g$, 24 $m^2/g$, 25 $m^2/g$, 26 $m^2/g$, 28 $m^2/g$, 30 $m^2/g$, 32 $m^2/g$, 34 $m^2/g$, 35 $m^2/g$, 36 $m^2/g$, 38 $m^2/g$, 40 $m^2/g$, or a value in a range formed by any two of the above points.

Herein, the specific surface area of the precursor can be tested by any means known in the art. As an example, reference was made to GB/T 19587-2017 "Determination of the Specific Surface Area of Solids by Gas Adsorption Using the BET Method". The determination was carried out with the device TriStar II 3020, the precursor was dispersed in a dispersing agent (ethanol), sonicated for 30 minutes, then the resulting precursor was placed into a vacuum drying cabinet for drying, and finally the specific surface area of the precursor was measured using a specific surface area tester.

The specific surface area of the precursor is controlled to be within an appropriate range to control the positive electrode active material to have an appropriate porosity, so that the battery has high energy density and excellent discharge performance and cycle performance.

In some embodiments, the molar concentration of the manganese element in the first raw material is 0.02 mol/L to 1.5 mol/L. In some embodiments, the molar concentration of the manganese element in the first raw material is 0.05 mol/L to 1.2 mol/L. In some embodiments, the molar concentration of the manganese element in the first raw material may be selected as 0.02 mol/L, 0.05 mol/L, 0.1 mol/L, 0.2 mol/L, 0.4 mol/L, 0.5 mol/L, 0.6 mol/L, 0.8 mol/L, 1.0 mol/L, 1.2 mol/L, 1.4 mol/L, 1.5 mol/L, or a value in a range formed by any two of the above points.

The molar concentration of the manganese element in the first raw material is controlled to be within an appropriate range to control the inner diameter of the pore in the positive electrode active material to be within an appropriate range, so that the battery has high energy density and excellent discharge performance and cycle performance.

In some embodiments, the precipitating agent includes one or a plurality of sodium hydroxide, sodium carbonate, sodium bicarbonate, or ammonium bicarbonate.

In some embodiments, the complexing agent includes one or a plurality of an ammonia solution, lactic acid, or polyvinyl pyrrolidone.

In some embodiments, the pH value of the co-precipitation reaction is 9 to 12. In some embodiments, the pH value of the co-precipitation reaction is 9 to 11. In some embodiments, the pH value of the co-precipitation reaction is 9, 10, 11, 12, or a value in a range formed by any two of the above points.

In some embodiments, the reaction temperature of the co-precipitation reaction is 50° C. to 80° C. In some embodiments, the reaction temperature of the co-precipitation reaction is 55° C. to 75° C. In some embodiments, the reaction temperature of the co-precipitation reaction may be selected as 50° C., 55° C., 60° C., 65° C., 70° C., 75° C., 80° C., or a value in a range formed by any two of the above points.

In some embodiments, the reaction time of the co-precipitation reaction is 6 h to 10 h. In some embodiments, the reaction time of the co-precipitation reaction is 6.5 h to 9.5 h. In some embodiments, the reaction time of the co-precipitation reaction may be selected as 6 h, 6.5 h, 7 h, 7.5 h, 8 h, 8.5 h, 9 h, 9.5 h, 10 h, or a value in a range formed by any two of the above points.

In some embodiments, the stirring speed of the co-precipitation reaction is 200 rmp to 500 rmp. In some embodiments, the stirring speed of the co-precipitation reaction is 230 rmp to 300 rmp. In some embodiments, the stirring speed of the co-precipitation reaction may be selected as 200 rmp, 250 rmp, 300 rmp, 350 rmp, 400 rmp, 450 rmp, 500 rmp, or a value in a range formed by any two of the above points.

Controlling the pH value, the reaction temperature, the reaction time, and the stirring speed of the co-precipitation reaction to be within an appropriate range allows the co-precipitation reaction to proceed more smoothly and more efficiently, and helps the formed pores to be distributed in a ring shape inside the primary particles of the positive electrode active material. In addition, the pores have an appropriate inner diameter, so that the battery has high energy density and excellent discharge performance and cycle performance.

[Positive Electrode Sheet]

The positive electrode sheet usually includes a positive electrode current collector and a positive electrode film layer disposed on at least one surface of the positive electrode current collector. The positive electrode film layer includes the positive electrode active material in any embodiment or the positive electrode active material prepared by adopting the preparation method in any embodiment.

As an example, the positive electrode current collector has two surfaces opposed in its own thickness direction, and the positive electrode film layer is provided on either one or both of the two opposed surfaces of the positive electrode current collector.

In some embodiments, the positive electrode film layer has an areal density of 24 mg/cm$^2$ to 46 mg/cm$^2$. In some embodiments, the areal density of the positive electrode film layer may be selected as 24 mg/cm$^2$, 25 mg/cm$^2$, 26 mg/cm$^2$, 28 mg/cm$^2$, 30 mg/cm$^2$, 32 mg/cm$^2$, 34 mg/cm$^2$, 35 mg/cm$^2$, 36 mg/cm$^2$, 38 mg/cm$^2$, 40 mg/cm$^2$, 42 mg/cm$^2$, 44 mg/cm$^2$, 45 mg/cm$^2$, 46 mg/cm$^2$, or a value in a range formed by any two of the above points.

The coating surface density of the positive electrode film layer is determined by measuring the coating weight (g) of the positive electrode film layer on one side and the coating area (cm$^2$) of the positive electrode film layer on one side (the number of collection points >14). Specifically, the coating surface density of the positive electrode film layer=the coating weight (g) of the positive electrode film layer on one side/the coating area (cm$^2$) of the positive electrode film layer.

In some embodiments, the thickness of the positive electrode film layer is 200 μm to 400 μm. In some embodiments, the thickness of the positive electrode film layer is 200 μm to 300 μm. In some embodiments, the thickness of the positive electrode film layer may be selected as 200 μm, 220 μm, 240 μm, 250 μm, 260 μm, 280 μm, 300 μm, 320 μm, 340 μm, 350 μm, 360 μm, 380 μm, 400 μm, or a value in a range formed by any two of the above points.

Controlling the thickness of the positive electrode film layer to be within an appropriate range can not only provide a sufficient amount of positive electrode active material to improve the energy density of the battery, but also reduce the influence on the solid-phase mass transfer of lithium ions. Therefore, both the energy density and the power performance of the battery are considered.

In some embodiments, the positive electrode current collector may use a metal foil or a composite current collector. For example, an aluminum foil can be used as the metal foil. The composite current collector may include a polymer material base layer and a metal layer formed on at least one surface of the polymer material base layer. The composite current collector may be formed by forming a metal material (aluminum, an aluminum alloy, nickel, a nickel alloy, titanium, a titanium alloy, silver, a silver alloy, and the like) on a base material of a polymer material such as a base material of polypropylene (PP), polyethylene terephthalate (PET), polybutylene terephthalate (PBT), polystyrene (PS), polyethylene (PE), and the like.

In some implementations, the positive electrode film layer optionally further includes a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some implementations, the positive electrode film layer further optionally includes a conductive agent. As an example, the conductive agent may include at least one of superconducting carbon, acetylene black, carbon black, ketjen black, carbon dots, carbon nanotubes, graphene, and carbon nanofibers.

In some implementations, the positive electrode tab may be prepared by dispersing the above components for preparing a positive electrode tab, for example, a positive electrode active material, a conductive agent, a binder, and any other components in a solvent (for example, N-methylpyrrolidone) to form a positive electrode slurry, and applying the positive electrode slurry to a positive electrode current collector, followed by drying, cold pressing, and the like.

[Negative Electrode Sheet]

The negative electrode sheet includes a negative electrode current collector and a negative electrode film layer disposed on at least one surface of the negative electrode current collector. The negative electrode film layer includes a negative electrode active material.

As an example, the negative electrode current collector has two surfaces opposite in its own thickness direction, and the negative electrode film layer is disposed on either one or both of the two opposite surfaces of the negative electrode current collector.

In some embodiments, the negative electrode current collector may use a metal foil or a composite current collector. For example, a copper foil may be used as the metal foil. The composite current collector may include a polymer material base layer and a metal layer formed on at least one surface of a polymer material substrate. The composite current collector may be formed by forming a metal material (copper, a copper alloy, nickel, a nickel alloy, titanium, a titanium alloy, silver, a silver alloy, or the like) on the polymer material substrate (e.g., a substrate of polypropylene (PP), polyethylene terephthalate (PET), polybutylene terephthalate (PBT), polystyrene (PS), or polyethylene (PE)).

In some embodiments, the negative electrode active material may be a negative electrode active material well-known in the art for batteries. As an example, the negative electrode active material may include at least one of the following materials: synthetic graphite, natural graphite, soft carbon, hard carbon, a silicon-based material, a tin-based material, lithium titanate, and the like. The silicon-based material may be selected from at least one of elemental silicon, a silicon-oxygen compound, a silicon-carbon composite, a silicon-nitrogen composite, and a silicon alloy. The tin-based material may be selected from at least one of elemental tin, a tin-oxygen compound, and a tin alloy. However, this application is not limited to these materials, and another conventional material that can be used as a negative electrode active material of a battery may also be used. These negative electrode active materials may be used alone or in combination of two or more thereof.

In some embodiments, the negative electrode active material includes silicon monoxide.

In some embodiments, the content of the silicon monoxide is 20% to 100% by mass based on the total mass of the negative electrode active material. In some embodiments, the content of the silicon monoxide is 50% to 100% by mass based on the total mass of the negative electrode active material.

In some implementations, the negative electrode film layer optionally further includes a binder. The binder may be selected from at least one of styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally includes a conductive agent. The conductive agent may be selected from at least one of superconducting carbon, acetylene black, carbon black, Ketjen black, carbon dots, carbon nanotubes, graphene, and carbon nanofibers.

In some embodiments, the negative electrode film layer further optionally includes another auxiliary agent, for example, a thickening agent (e.g., sodium carboxymethyl cellulose (CMC-Na)).

In some embodiments, the negative electrode sheet may be prepared in the following manner: dispersing the above-mentioned components for preparing the negative electrode sheet, for example, the negative electrode active material, the conductive agent, the binder, and any other component in a solvent (e.g., deionized water) to form a negative electrode slurry; and coating the negative electrode slurry on the negative electrode current collector, and performing procedures such as drying and cold pressing, to obtain the negative electrode sheet.

[Separator]

In some embodiments, the secondary battery further includes a separator. Any known porous structure separator with good chemical stability and mechanical stability may be used.

In some embodiments, a material of the separator may be selected from at least one of glass fibers, nonwoven fabrics, polyethylene, polypropylene, and polyvinylidene fluoride. The separator may be a single-layer film or a multilayer composite film. When the separator is a multilayer composite film, the materials of respective layers may be the same or different.

In some embodiments, the positive electrode sheet, the negative electrode sheet, and the separator may be manufactured into the electrode assembly through a winding process or a lamination process.

In some embodiments, the secondary battery includes a negative electrode sheet, a separator, an electrolyte, and a positive electrode sheet in some embodiments.

In some embodiments, the secondary battery may include a lithium secondary battery.

In some embodiments, the energy density of the secondary battery is 380 Wh/kg to 500 Wh/kg.

In some embodiments, the secondary battery may include an outer package. The outer package may be used to encapsulate the electrode assembly and the electrolyte described above.

In some implementations, the outer package of the secondary battery may be a hard case, such as a hard plastic case, an aluminum case, a steel case, or the like. The outer package of the secondary battery may also be a pouch, such as a bag-type pouch. The material of the pouch may be plastic, and examples of the plastic include polypropylene, polybutylene terephthalate, and polybutylene succinate.

Figure 2:
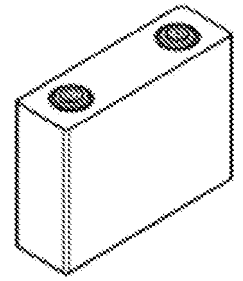
FIG. 2 is a schematic diagram of a secondary battery according to an embodiment of the present application.

The shape of the secondary battery in the present application may be a cylindrical shape, a square shape, or any other shape. For example, FIG. 2 shows a secondary battery 5 of a square structure as an example.

Figure 3:
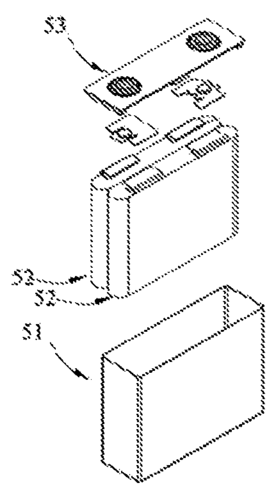
FIG. 3 is an exploded view of the secondary battery shown in FIG. 2 according to an embodiment of the present application.

In some embodiments, referring to FIG. 3, the outer package may include a housing 51 and a cover plate 53. The housing 51 may include a bottom plate and side plates connected to the bottom plate, and the bottom plate and the side plates may define an accommodating chamber. The housing 51 has an opening communicating with the accommodating chamber, and the cover plate 53 can cover the opening to close the accommodating chamber. The positive electrode sheet, the negative electrode sheet, and the separator may be formed into an electrode assembly 52 through a winding process or a lamination process. The electrode assembly 52 is enclosed within the accommodation chamber. The electrolyte is impregnated into the electrode assembly 52. There may be one or a plurality of electrode assemblies 52 included in the secondary battery 5, and the number may be selected by those skilled in the art according to specific practical requirements.

In some implementations, the secondary batteries may be assembled into a battery module, and there may be one or a plurality of secondary batteries included in the battery module, and the specific number may be selected by those skilled in the art according to the application and capacity of the battery module.

Figure 4:
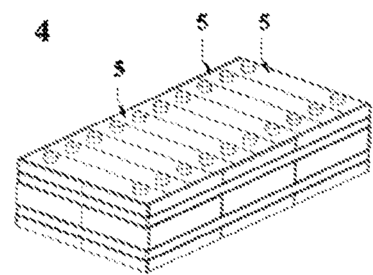
FIG. 4 is a schematic diagram of a battery module according to an implementation of this application.

FIG. 4 shows a battery module 4 as an example. Referring to FIG. 4, in the battery module 4, a plurality of secondary batteries 5 may be arranged in series in the longitudinal direction of the battery module 4. Certainly, the secondary batteries may alternatively be arranged in any other manner. Further, the plurality of secondary batteries 5 may be fixed by fasteners.

Optionally, the battery module 4 may further include a housing with an accommodating space. The plurality of secondary batteries 5 are accommodated in the accommodating space.

In some implementations, the battery modules may be further assembled into a battery pack, and there may be one or a plurality of battery modules included in the battery pack, and the specific number may be selected by those skilled in the art according to the application and capacity of the battery pack.

Figure 5:
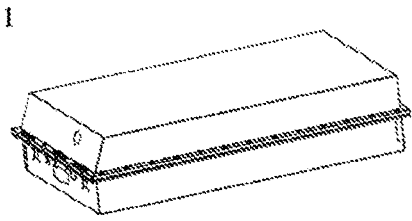
FIG. 5 is a schematic diagram of a battery pack according to an implementation of this application.
Figure 6:
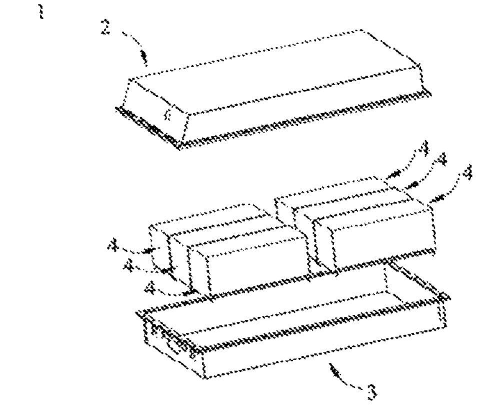
FIG. 6 is an exploded view of the battery pack shown in FIG. 5 according to an embodiment of the present application.

FIG. 5 and FIG. 6 show a battery pack 1 as an example. Referring to FIG. 5 and FIG. 6, a battery case and a plurality of battery modules 4 disposed in the battery case may be included in the battery pack 1. The battery case includes an upper case 2 and a lower case 3, the upper case 2 being capable of covering the lower case 3 and forming a closed space for accommodating the battery modules 4. The plurality of battery modules 4 may be arranged in any manner in the battery box.

In addition, the present application further provides an electric device including at least one of a secondary battery, a battery module, or a battery pack provided by the present application. The secondary battery, the battery module, or the battery pack may be used as a power source of the electric device and may also be used as an energy storage unit of the electric device. The electric device may include a mobile device (e.g., a mobile phone, a notebook computer, etc.), an electric vehicle (e.g., a pure electric vehicle, a hybrid electric vehicle, a plug-in hybrid electric vehicle, an electric bicycle, an electric scooter, an electric golf cart, an electric truck, etc.), an electric train, a ship, a satellite, an energy storage system, and the like, but is not limited thereto.

The secondary battery, the battery module, or the battery pack may be selected according to use requirements of the electric device.

Figure 7:
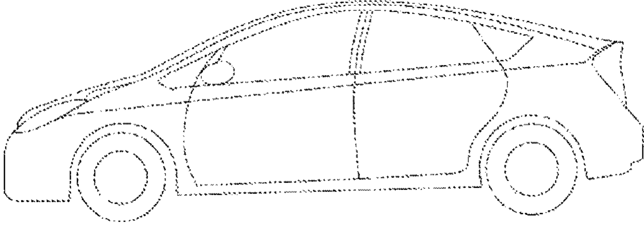
FIG. 7 is a schematic diagram of an electric device using a secondary battery as a power supply according to an embodiment of the present application.

FIG. 7 shows an electric device as an example. The electric device is a pure electric vehicle, a hybrid electric vehicle, a plug-in hybrid electric vehicle, or the like. In order to meet the demand for high power and high energy density of the secondary battery by the electric device, a battery pack or a battery module may be used.

In another example, the apparatus may be a cell phone, a tablet computer, a notebook computer, or the like. This electric device is generally required to be thin and light-weight, and may use a secondary battery as a power supply.

EXAMPLES

Embodiments of the present application are described below. The example described below are illustrative only and are not to be construed as limiting the present application. In the embodiments, specific techniques or conditions are not indicated, and they are performed according to techniques or conditions described in documents in the art or according to the specification of the product. The reagents or instruments used without specifying the manufacturer(s) are conventional products that are commercially available.

I. Preparation Method

Example 1

(1) Method for Preparing a Positive Electrode Active Material

A nickel-cobalt-manganese solution with a molar ratio of 96:1:3 between nickel, cobalt, and manganese elements was prepared, and the concentration was adjusted to 2 mol/L, where nickel sulfate, cobalt sulfate, and manganese sulfate were respectively used as raw materials for soluble nickel-cobalt-manganese, and the molar concentration of manganese ions was 0.3 mol/L; a 3 mol/L sodium hydroxide solution was prepared; and a 6 mol/L ammonia solution was prepared.

In a nitrogen atmosphere, the nickel-cobalt-manganese solution, the sodium hydroxide solution, and the ammonia solution were simultaneously added to a reaction kettle for a co-precipitation reaction, and the number of revolutions was controlled at 300 rpm, the temperature was controlled at 80° C., the time was controlled at 10 h, the pH of the system was controlled at 9.1, and the concentration of the ammonia solution was controlled at 6 mol/L. After the completion of the co-precipitation reaction, the reaction material was transferred to a slurry tank for aging and washing, and dried in an oven at 120° C. for 10 h after being dehydrated. The dried material was sieved and demagnetized to obtain a precursor.

The precursor and lithium hydroxide were uniformly mixed at a ratio such that the molar ratio of Li/Me was 1.03, where Me was the total molar content of the nickel element, the cobalt element, and the manganese element.

The uniformly mixed material was placed into a furnace for calcination, the heating rate was set to 3° C./min, the temperature was maintained at 760° C. for 20 h, the atmosphere was required to have an oxygen content ≥98%, and then the furnace was cooled to obtain a base material.

The base material, cobalt boride, and titanium boride were mixed in a high mixer at a mass ratio of 1:0.015:0.0041 in a nitrogen atmosphere, and then placed into a furnace for calcination at a calcination temperature of 350° C. for 5 h in a nitrogen calcination atmosphere to obtain a product. The product was washed with water for 30 min, centrifuged, filtered, and then vibration-dried to obtain a positive electrode active material $LiNi_{0.96}Co_{0.01}Mn_{0.028}Ti_{0.001}B_{0.001}O_2$ including secondary pores distributed between primary particles.

(2) Preparation of a Positive Electrode Sheet

The above-mentioned positive electrode active material, conductive carbon black, and a binder polyvinylidene fluoride (PVDF) were added to N-methylpyrrolidone at a mass ratio of 97:1:2 and were mixed and stirred for 0.5 h to 6 h to obtain a positive electrode slurry; and then the positive electrode slurry was uniformly coated on the surface of a positive electrode current collector, followed by drying, cold pressing, and slitting to obtain a positive electrode sheet.

(3) Preparation of a Negative Electrode Sheet

Artificial graphite doped with silicon monoxide (SIO), conductive carbon black, a carbon nanotube (CNT), a binder styrene-butadiene rubber (SBR), and a thickening agent sodium carboxymethyl cellulose (CMC) were added to deionized water at a mass ratio of 94.5:1:0.375:2.8:1.325 based on the mass of the artificial graphite, where the mass fraction of SIO is XX, and were mixed and stirred for 0.5 h to 6 h to obtain a negative electrode active material layer slurry; and the negative electrode active material layer slurry is layered and uniformly coated on a negative electrode current collector copper foil, followed by drying, cold pressing, and slitting to obtain a positive electrode sheet.

(4) Electrolyte

In a glove box in an argon atmosphere ($H_2O$<0.1 ppm, and $O_2$<0.1 ppm), a lithium salt $LiPF_6$/LIFSI was dissolved in a solvent of an organic solvent ethylene carbonate/ethyl methyl carbonate/diethyl carbonate/fluoroethylene carbonate (volume ratio 1:1:1:1), and the solvent was stirred uniformly to obtain an electrolyte having a lithium salt concentration of 1 mol/L.

(5) Separator

Using a polypropylene film as a base film, 1 micron of alumina (CCS)+1 micron of polyvinylidene fluoride (PCS) was coated on the base film.

(6) Preparation of a Battery

The positive electrode sheet, the separator, and the negative electrode sheet were stacked in order, where the separator was located between the positive and negative electrode sheets to play a separating role, and the positive electrode sheet, the separator, and the negative electrode sheet were wound to obtain a bare cell, a tab was welded to the bare cell, and the bare cell was enclosed in an aluminum case and baked at 80° C. to remove water, and then the electrolyte solution was injected and the aluminum case was sealed to obtain an uncharged battery. The uncharged battery was further subjected to steps such as standing, hot and cold pressing, chemical forming, shaping, and capacity testing in order to obtain the lithium battery product of Example 1.

Example 2

The battery of Example 2 was prepared in a method similar to that of the battery of Example 1, but the preparation method for the precursor of the positive electrode active material was adjusted to adjust the secondary pore size of the positive electrode active material, and specific parameters were shown in Table 1 and Table 2.

Example 3

The battery of Example 3 was prepared in a method similar to that of the battery of Example 1, but the preparation method for the precursor of the positive electrode active material was adjusted to adjust the primary particles of the positive electrode active material to have primary pores, and specific parameters were shown in Table 1 and Table 2.

Examples 4 to 11

The batteries of Examples 4 to 11 were prepared in a method similar to that of the battery of Example 1, but the preparation method for the precursor of the positive electrode active material was adjusted to adjust the inner diameter of the secondary pore, and the porosity and the SPAN value of the positive electrode active material, and specific parameters were shown in Table 1 and Table 2.

Examples 12 to 21

The batteries of Examples 12 to 21 were prepared in a method similar to that of the battery of Example 3, but the precursor preparation method, the heating rate, the temperature, or the time in the calcination of the precursor and the lithium salt were adjusted to adjust the primary particles D of the positive electrode active material, and the Dv50 or the SPAN value of the secondary particles. Details are as follows.

Example 12: The PH of the co-precipitation reaction in the precursor preparation method was 9.4, the precursor and the lithium hydroxide were mixed at a certain ratio and then calcined, the heating temperature was set to 3° C./min, and the temperature was maintained at 800° C. for 22 h.

Example 13: The PH of the co-precipitation reaction in the precursor preparation method was 9.3, the precursor and the lithium hydroxide were mixed at a certain ratio and then calcined, the heating temperature was set to 3° C./min, and the temperature was maintained at 790° C. for 22 h.

Example 14: The PH of the co-precipitation reaction in the precursor preparation method was 9.1, the precursor and the lithium hydroxide were mixed at a certain ratio and then calcined, the heating temperature was set to 3° C./min, and the temperature was maintained at 780° C. for 21 h.

Example 15: The stirring speed of the co-precipitation reaction in the precursor preparation method was 290 rmp, the precursor and the lithium hydroxide were mixed at a certain ratio and then calcined, the heating temperature was set to 3° C./min, and the temperature was maintained at 740° C. for 18 h.

Example 16: The precursor and the lithium hydroxide were mixed at a certain ratio and then calcined, the heating temperature was set to 7° C./min, and the temperature was maintained at 760° C. for 20 h.

Example 17: The precursor and the lithium hydroxide were mixed at a certain ratio and then calcined, the heating temperature was set to 2.5° C./min, and the temperature was maintained at 760° C. for 20 h.

Example 18: The precursor and the lithium hydroxide were mixed at a certain ratio and then calcined, the heating temperature was set to 5° C./min, and the temperature was maintained at 760° C. for 20 h.

Example 19: The precursor and the lithium hydroxide were mixed at a certain ratio and then calcined, the heating temperature was set to 2° C./min, and the temperature was maintained at 760° C. for 20 h.

Examples 20 and 21

The batteries of Examples 20 and 21 were prepared in a method similar to that of the battery of Example 3, but the preparation method for the precursor of the positive electrode active material was adjusted to adjust the SPAN value of the positive electrode active material, and specific parameters were shown in Table 1 and Table 2.

Examples 22 and 23

The batteries of Examples 22 to 23 were prepared in a method similar to that of the battery of Example 3, but the thickness of the positive electrode sheet was adjusted, and specific parameters were shown in Table 1 and Table 2.

Examples 24 to 27

The batteries of Examples 24 to 27 were prepared in a method similar to that of the battery of Example 3, but the preparation method for the precursor of the positive electrode active material was adjusted to adjust the inner diameters of the primary pores of the primary particles of the positive electrode active material or the average particle size D of the primary particles, and specific parameters were shown in Table 1 and Table 2.

Example 28: The battery of Example 28 was prepared in a method similar to that of the battery of Example 3, but the molar ratio of the nickel and manganese elements in the preparation method for the precursor of the positive electrode active material was adjusted to 97:3 to obtain a positive electrode active material $LiNi_{0.97}Mn_{0.028}Ti_{0.001}B_{0.001}O_2$.

Example 29: The battery of Example 29 was prepared in a method similar to that of the battery of Example 3, but the molar ratio of the nickel element, the aluminum element, and the manganese element in the preparation method for the precursor of the positive electrode active material was adjusted to 96:1:3 to obtain a positive electrode active material $LiNi_{0.96}Al_{0.01}Mn_{0.028}Ti_{0.001}B_{0.001}O_2$.

Example 30: The battery of Example 30 was prepared in a method similar to that of the battery of Example 3, but without the final doping reaction of cobalt boride and titanium boride, a positive electrode active material $LiNi_{0.96}Co_{0.01}Mn_{0.03}O_2$ was obtained.

Comparative Example 1

The battery of Comparative example 1 was prepared in a method similar to that of the battery of Example 1, but the primary particles of the positive electrode active material were prepared in a solid structure, and the preparation method was specifically as follows:

A nickel-cobalt-manganese solution with a molar ratio of 96:1:3 between nickel, cobalt, and manganese elements was prepared, and the concentration is adjusted to 2 mol/L, where nickel sulfate, cobalt sulfate, and manganese sulfate were respectively used as raw materials for soluble nickel-cobalt-manganese, and the molar concentration of manganese ions was 0.005 mol/L; a 0.8 mol/L sodium hydroxide solution was prepared; and a 6 mol/L ammonia solution was prepared.

In a nitrogen atmosphere, the nickel-cobalt-manganese solution, the sodium hydroxide solution, and the ammonia solution were simultaneously added to a reaction kettle for a co-precipitation reaction, and the number of revolutions was controlled at 600 rpm, the temperature was controlled at 78° C., the time was controlled at 9 h, the pH of the system was controlled at 11.5, and the concentration of the ammonia solution was controlled at 6 mol/L. After the completion of the co-precipitation reaction, the reaction material was transferred to a slurry tank for aging and washing, and dried in an oven at 120° C. for 10 h after being dehydrated. The dried material was sieved and demagnetized to obtain a closely arranged precursor.

The precursor and lithium hydroxide were uniformly mixed at a ratio such that the molar ratio of Li/Me was 1.03, where Me was the total molar content of the nickel element, the cobalt element, and the manganese element.

The uniformly mixed material was placed into an oxygen-atmosphere furnace, the heating rate was set to 5° C./min, the temperature was maintained at 800° C. for 24 h, the atmosphere was required to have an oxygen content ≥98%, and then the furnace was cooled to obtain a base material.

The base material, cobalt boride, and titanium boride were mixed in a high mixer at a mass ratio of 1:0.015:0.0041 in a nitrogen atmosphere, and then placed into a furnace for calcination at a calcination temperature of 350° C. for 5 h in a nitrogen calcination atmosphere to obtain a product. The product was washed with water for 30 min, centrifuged, filtered, and then vibration-dried to obtain a positive electrode active material $LiNi_{0.96}Co_{0.01}Mn_{0.028}$ $Ti_{0.001}B_{0.001}O_2$ having no pores.

Comparative Examples 2 and 3

The batteries of Comparative examples 2 to 3 were prepared in a method similar to that of the battery of Comparative example 1, but the parameters of the preparation method for the positive electrode active material were adjusted so that the inner diameters of the pores of the primary particles of the positive electrode active material were respectively 0.05 microns and 3 microns. Specific parameters were shown in Table 1 and Table 2.

Comparative Example 4

The battery of Comparative example 4 was prepared in a method similar to that of the battery of Comparative example 28, but the preparation method was adjusted so that the positive electrode active material did not have pores. For details, refer to Table 4.

Comparative Examples 5 and 6

The batteries of Comparative examples 5 and 6 were prepared in a method similar to that of the battery of Comparative example 4, but the parameters of the preparation method for the positive electrode active material were adjusted so that the inner diameters of the pores of the primary particles of the positive electrode active material were respectively 0.05 microns and 3 microns. For details, refer to Table 14.

Comparative Example 7

The battery of Comparative example 7 was prepared in a method similar to that of the battery of Comparative example 29, but the preparation method was adjusted so that the positive electrode active material did not have pores. For details, refer to Table 5.

Comparative Example 8

The battery of Comparative example 8 was prepared in a method similar to that of the battery of Comparative example 30, but the preparation method was adjusted so that the positive electrode active material did not have pores. For details, refer to Table 6.

II. Performance Test

1. Performance Test of a Positive Electrode Active Material (1) Inner Diameter Test of a Pore A conductive adhesive was attached to a sample stage, a powdery sample of the positive electrode active material in each example and comparative example was spread on the conductive adhesive, non-adhered powder was blown off with an ear washing ball, gold was sprayed, and a cross section of a particle of the powdery sample was cut using argon plasma. A scanning electron microscope (for example, ZEISS Sigma 300) was used to obtain a scanning electron microscope photo of the powdery sample under conditions of an acceleration voltage of 10 kV and an emission current of 10 mA. The inner diameter size of the primary pore was measured according to the SEM photo, at least three samples were measured, data of at least 50 primary particles was measured for each sample, and an average value of the data was taken as the inner diameter size of the primary pore of the sample.

(2) Porosity Test

According to GB/T 24586, the gas displacement method was used for measurement. Porosity=(V1−V2)/V1×100%, where V1 is the apparent volume of the sample and V2 is the true volume of the sample.

(3) Specific Surface Area Test of a Precursor

Reference was made to GB/T 19587-2017 "Determination of the Specific Surface Area of Solids by Gas Adsorption Using the BET Method". The determination was carried out with the device TriStar II 3020, the precursor was dispersed in a dispersing agent (ethanol), sonicated for 30 minutes, then the resulting precursor was placed into a vacuum drying cabinet for drying, and finally the specific surface area of the precursor was measured using a specific surface area tester.

(4) Particle Size Test of a Primary Particle

D Test of Primary Particles of a Positive Electrode Active Material:

After imaging was performed by a scanning electron microscope (ZEISS Sigma-02-33, Germany) at a magnification of 500, 200 to 600 primary particles of the positive electrode active material that have a complete shape and no shade were randomly selected from an electron microscopic image of the scanning electron microscope, the longest diameters of pores in the primary particles in the microscopic image were recorded, and an average value of the longest diameters was taken as the average particle size D.

Median particle size D' test of primary precursor particles: After imaging was performed by a scanning electron microscope (ZEISS Sigma-02-33, Germany) at a magnification of 500, 200 to 600 primary particles of the precursor material that have a complete shape and no shade were randomly selected from an electron microscopic image of the scanning electron microscope, the longest diameters of pores in the primary particles in the microscopic image were recorded, and an average value of the longest diameters was taken as the average particle size D.

(5) Particle Size Test of a Secondary Particle

The Dv50 test of the secondary particles of the positive electrode active material is as follows: Referring to the particle size distribution laser diffraction method of GB/T 19077-2016, 0.1 g to 0.13 g of positive electrode active material samples to be tested were weighed in a 50 mL beaker, 5 g of anhydrous ethanol was added, a stirring bar of about 2.5 mm was placed, and then the breaker was sealed with a plastic wrap. The samples were sonicated for 5 min and then transferred to a magnetic stirrer and stirred at 500 rpm for more than 20 min. For each batch, two samples were selected for testing. The test was carried out using a Mastersizer Model 2000E laser particle size analyzer from Malvern Instruments Ltd., UK. The Dv90 was a particle size corresponding to a cumulative volume distribution percentage of the secondary particles of the positive electrode active material reaching 90%, the Dv50 was a particle size corresponding to a cumulative volume distribution percentage of the secondary particles of the positive electrode active material reaching 50%, and the Dv10 was a particle size corresponding to a cumulative volume distribution percentage of the secondary particles of the positive electrode active material reaching 10%. SPAN=(Dv90−Dv10)/Dv50.

Median particle size Dv50' test of secondary precursor particles: With reference to the particle size distribution laser diffraction method of GB/T 19077-2016, 0.1 g to 0.13 g of positive electrode active material samples to be tested were weighed in a 50 ml beaker, 5 g of anhydrous ethanol was added, a stirrer bar of about 2.5 mm was placed, and the mixture was sealed with a wrap film. The samples were sonicated for 5 min and then transferred to a magnetic stirrer and stirred at 500 rpm for more than 20 min. For each batch, two samples were selected for testing. The test was carried out using a Mastersizer Model 2000E laser particle size analyzer from Malvern Instruments Ltd., UK. The median diameter Dv50' was a particle size corresponding to a cumulative volume distribution percentage of the secondary precursor particles reaching 50%.

(6) Crystal Plane Area Test of a (010) Crystal Plane

The area of the (010) crystal plane was tested using an X-ray powder diffractometer (XRD, instrument model: Bruker D8 ADVANCE) with a target material of Cu Kα, a voltage and current of 40 KV/40 mA, a scanning angle range of 5° to 80°, a scanning step of 0.00836°, and time of 0.3 s per step.

2. Battery Performance Test (1) Discharge Capacity Test

The cell was allowed to stand at 25° C. for 2 h, ensuring that the cell temperature was 25° C. At 25° C., the cell was charged at 0.1 C to a charge cutoff voltage of 4.25 V, and then constant-voltage charging was continued at the charge cutoff voltage until the current reached 0.05 C, and the charge was cut off (where C represents the rated capacity of the cell). The cell was allowed to stand at 25° C. for 1 h. At 25° C., the cell was discharged at 0.1 C to a discharge cutoff voltage of 2.5 V, and the total discharge capacity C0 discharged from the cell was recorded.

(2) Energy Density Test

Capacity test of a cell: The cell was allowed to stand at 25° C. for 2 h, ensuring that the cell temperature was 25° C. At 25° C., the cell was charged at 0.1 C to a charge cutoff voltage of 4.25 V, and then constant-voltage charging was continued at the charge cutoff voltage until the current reached 0.05 C, and the charge was cut off (where C represents the rated capacity of the cell). The cell was allowed to stand at 25° C. for 1 h. At 25° C., the cell was discharged at 0.1 C to a discharge cutoff voltage of 2.5 V, and the total discharge capacity C0 discharged from the cell was recorded. The total discharge energy was E0.

Weight test of a cell: The cell was placed on an electronic scales until the weight was stable, and the cell weight value M0 was read.

Energy density calculation: Cell discharge energy E0/cell weight M0 is the energy density of the cell.

(3) Battery 40% SOC Discharge Time Test

Battery 40% SOC Discharge Time

The cell was discharged at a constant current of 0.33 C to 2.8 V and left stand for 30 min, charged at a constant current of 0.33 C to 4.25 V and then at a constant voltage of 0.05 C until the voltage stabilized and left stand for 30 min, discharged at a constant current of 0.33 C to 2.8 V at which the initial capacity C0 was read and left stand for 30 min, charged at a constant current of 0.33 C to 4.25 V and then at a constant voltage of 0.05 C until the voltage stabilized and left stand for 30 min, discharged at a constant current of 0.33 C to 0.4 C0 Ah (40%) SOC and left stand for 60 min, and discharged at a constant current of 4.5 C to 2.8 V, and the discharge time was recorded.

(4) Cycling Performance Test

The secondary batteries prepared in Examples and Comparative examples were subjected to the following one charge-discharge cycle: the batteries were charged at a constant current at a rate of 0.5 C to a charge cutoff voltage 4.25 V, then were charged at a constant voltage until the current ≤0.05 C and left stand for 5 min, and then were discharged at a constant current at a rate of 0.33 C to a discharge cutoff voltage 2.5 V and left stand for 5 min. According to this method, the battery was subjected to a cyclic charge-discharge test until the battery capacity was attenuated to 80%. At this point, the number of cycles is the cycle life of the battery at 25° C.

III. Analysis of Test Results of Examples and Comparative Examples

The batteries in Examples and Comparative examples were each prepared according to the above method, and the parameters were measured. The results are shown in Table below.

TABLE 1

| | Preparation parameters for the precursor of the positive electrode active material | | | | | | | |
|---|---|---|---|---|---|---|---|---|
| | Total molar concentration of metal ions in | Molar concentration of the | Molar concentration of the | Molar concentration of the | Co-precipitation | | | |
| No. | the mixed salt solution/(mol/L) | manganese element/(mol/L) | complexing agent/(mol/L) | precipitating agent/(mol/L) | PH | Temperature/° C. | Time/h | Stirring speed/rpm |
| Example 1 | 2 | 0.3 | 6 | 3 | 9.1 | 80 | 10 | 300 |
| Example 2 | 2 | 0.05 | 4.5 | 2.6 | 9.5 | 79 | 8 | 350 |
| Example 3 | 2 | 0.3 | 6 | 3 | 9 | 80 | 10 | 300 |
| Example 4 | 2 | 1 | 5 | 2.9 | 9.2 | 78 | 9 | 280 |
| Example 5 | 2 | 0.7 | 5.3 | 2.8 | 9.5 | 78 | 9 | 270 |
| Example 6 | 2 | 0.05 | 4.5 | 2.6 | 9.7 | 79 | 8 | 350 |
| Example 7 | 2 | 0.1 | 4 | 2.7 | 9.6 | 76 | 8 | 380 |
| Example 8 | 2 | 1.5 | 5 | 1.9 | 9.8 | 74 | 7.8 | 230 |
| Example 9 | 2 | 1.2 | 4.8 | 1.8 | 10 | 73 | 7.6 | 250 |
| Example 10 | 2 | 0.05 | 4.2 | 1.6 | 10.2 | 73 | 7.2 | 420 |
| Example 11 | 2 | 0.02 | 3.8 | 1.5 | 10.4 | 72 | 6.8 | 460 |
| Example 12 | 2 | 0.3 | 6 | 3 | 9.4 | 80 | 10 | 300 |

TABLE 1-continued

| No. | Preparation parameters for the precursor of the positive electrode active material: Total molar concentration of metal ions in the mixed salt solution/(mol/L) | Molar concentration of the manganese element/(mol/L) | Molar concentration of the complexing agent/(mol/L) | Molar concentration of the precipitating agent/(mol/L) | Co-precipitation: PH | Temperature/° C. | Time/h | Stirring speed/rpm |
|---|---|---|---|---|---|---|---|---|
| Example 13 | 2 | 0.3 | 6 | 3 | 9.3 | 80 | 10 | 300 |
| Example 14 | 2 | 0.3 | 6 | 3 | 9.1 | 80 | 10 | 300 |
| Example 15 | 2 | 0.3 | 6 | 3 | 9 | 80 | 10 | 290 |
| Example 16 | 2 | 0.3 | 6 | 3 | 9 | 80 | 10 | 300 |
| Example 17 | 2 | 0.3 | 6 | 3 | 9 | 80 | 10 | 300 |
| Example 18 | 2 | 0.3 | 6 | 3 | 9 | 80 | 10 | 300 |
| Example 19 | 2 | 0.3 | 6 | 3 | 9 | 80 | 10 | 300 |
| Example 20 | 2 | 0.3 | 6 | 3 | 9 | 79 | 10 | 300 |
| Example 21 | 2 | 0.3 | 6 | 3 | 9 | 78 | 10 | 300 |
| Example 22 | 2 | 0.3 | 6 | 3 | 9 | 80 | 10 | 300 |
| Example 23 | 2 | 0.3 | 6 | 3 | 9 | 80 | 10 | 300 |
| Example 24 | 2 | 0.3 | 6 | 3 | 9 | 80 | 9.5 | 300 |
| Example 25 | 2 | 0.3 | 6 | 3 | 9 | 80 | 9.7 | 300 |
| Example 26 | 2 | 0.3 | 6 | 3 | 9.2 | 80 | 9.9 | 300 |
| Example 27 | 2 | 0.3 | 6 | 3 | 9.5 | 80 | 9.9 | 290 |
| Comparative example 1 | 2 | 0.005 | 6 | 0.8 | 11.5 | 78 | 9 | 600 |
| Comparative example 2 | 2 | 0.008 | 5.8 | 0.82 | 11.3 | 80 | 9.2 | 580 |
| Comparative example 3 | 2 | 1.5 | 5.6 | 3.5 | 9.2 | 72 | 0.4 | 320 |

TABLE 2

| No. | Positive electrode active material: Inner diameter of the secondary pore/μm | Inner diameter of the primary pore/μm | Porosity | D of the secondary particles/μm | Dv50 of the secondary particles/μm | Secondary particle (Dv90 − Dv10)/Dv50 | Crystal plane area of the (010) crystal plane/μm$^2$ | Positive electrode sheet Thickness/μm |
|---|---|---|---|---|---|---|---|---|
| Example 1 | 0.8 | / | 3% | 500 | 9 | 1.3 | 242 | 300 |
| Example 2 | 0.2 | / | 3% | 500 | 9 | 1.2 | 222 | 300 |
| Example 3 | 0.8 | 0.09 | 5% | 500 | 9 | 1.3 | 270 | 300 |
| Example 4 | 2 | 0.09 | 8% | 500 | 9 | 1.35 | 275 | 300 |
| Example 5 | 1 | 0.09 | 7% | 500 | 9 | 1.4 | 270 | 300 |
| Example 6 | 0.2 | 0.09 | 1% | 500 | 9 | 1.2 | 212 | 300 |
| Example 7 | 0.1 | 0.09 | 1% | 500 | 9 | 1.16 | 210 | 300 |
| Example 8 | 0.8 | 0.09 | 12% | 500 | 9 | 1.12 | 228 | 300 |
| Example 9 | 0.8 | 0.09 | 10% | 500 | 9 | 1.13 | 225 | 300 |
| Example 10 | 0.8 | 0.09 | 0.20% | 500 | 9 | 1.15 | 222 | 300 |
| Example 11 | 0.8 | 0.09 | 0.10% | 500 | 9 | 1.18 | 220 | 300 |
| Example 12 | 0.8 | 0.09 | 5% | 100 | 9 | 1.22 | 265 | 300 |
| Example 13 | 0.8 | 0.99 | 5% | 120 | 9 | 1.22 | 265 | 300 |
| Example 14 | 0.8 | 0.09 | 5% | 300 | 9 | 1.22 | 265 | 300 |
| Example 15 | 0.8 | 0.09 | 5% | 800 | 9 | 1.22 | 265 | 300 |
| Example 16 | 0.8 | 0.09 | 5% | 500 | 3 | 1.22 | 260 | 300 |
| Example 17 | 0.8 | 0.09 | 5% | 500 | 11 | 1.22 | 260 | 300 |
| Example 18 | 0.8 | 0.09 | 5% | 500 | 4 | 1.22 | 260 | 300 |
| Example 19 | 0.8 | 0.09 | 5% | 500 | 12 | 1.22 | 260 | 300 |
| Example 20 | 0.8 | 0.09 | 5% | 500 | 9 | 1.5 | 252 | 300 |
| Example 21 | 0.8 | 0.09 | 5% | 500 | 9 | 0.8 | 243 | 300 |
| Example 22 | 0.8 | 0.09 | 5% | 500 | 9 | 1.3 | 270 | 200 |
| Example 23 | 0.8 | 0.09 | 5% | 500 | 9 | 1.3 | 270 | 400 |
| Example 24 | 0.8 | 0.05 | 1% | 500 | 9 | 1.3 | 226 | 300 |
| Example 25 | 0.8 | 0.08 | 2%% | 500 | 9 | 1.3 | 231 | 300 |
| Example 26 | 0.8 | 0.2 | 5.2%% | 500 | 9 | 1.3 | 243 | 300 |
| Example 27 | 0.8 | 0.6 | 5.5%% | 800 | 9 | 1.3 | 262 | 300 |
| Comparative example 1 | / | / | / | 500 | 9 | 1.2 | 230 | 300 |
| Comparative example 2 | 0.05 | 0.09 | 0.50% | 500 | 9 | 1.18 | 232 | 300 |
| Comparative example 3 | 3 | 0.09 | 15% | 500 | 9 | 1.09 | 252 | 300 |

TABLE 3

| No. | Battery<br>Energy density (Wh/kg) | Discharge time/s | Number of cycles/cycle |
|---|---|---|---|
| Example 1 | 426 | 142 | 1221 |
| Example 2 | 427 | 126 | 1230 |
| Example 3 | 430 | 158 | 1600 |
| Example 4 | 415 | 158 | 800 |
| Example 5 | 418 | 150 | 1200 |
| Example 6 | 422 | 108 | 880 |
| Example 7 | 423 | 102 | 920 |
| Example 8 | 416 | 138 | 600 |
| Example 9 | 419 | 141 | 700 |
| Example 10 | 425 | 112 | 900 |
| Example 11 | 427 | 116 | 950 |
| Example 12 | 429 | 157 | 1550 |
| Example 13 | 428 | 155 | 1500 |
| Example 14 | 427 | 153 | 1450 |
| Example 15 | 426 | 148 | 1200 |
| Example 16 | 426 | 156 | 1380 |

TABLE 3-continued

| No. | Battery<br>Energy density (Wh/kg) | Discharge time/s | Number of cycles/cycle |
|---|---|---|---|
| Example 17 | 426 | 132 | 1360 |
| Example 18 | 426 | 152 | 1340 |
| Example 19 | 426 | 152 | 1300 |
| Example 20 | 428 | 141 | 1150 |
| Example 21 | 425 | 145 | 1250 |
| Example 22 | 360 | 170 | 1800 |
| Example 23 | 500 | 90 | 700 |
| Example 24 | 427 | 121 | 1011 |
| Example 25 | 428 | 139 | 1061 |
| Example 26 | 430 | 151 | 1271 |
| Example 27 | 426 | 147 | 952 |
| Comparative example 1 | 405 | 100 | 400 |
| Comparative example 2 | 407 | 102 | 420 |
| Comparative example 3 | 410 | 134 | 450 |

TABLE 4

| No. | Preparation parameters for the precursor of the positive electrode active material<br>Total molar concentration of metal ions in the mixed salt solution/(mol/L) | Molar concentration of the manganese element/(mol/L) | Molar concentration of the complexing agent/(mol/L) | Molar concentration of the precipitating agent/(mol/L) | Co-precipitation<br>PH | Temperature/° C. | Time/h | Stirring speed/rpm |
|---|---|---|---|---|---|---|---|---|
| Example 28 | 2 | 0.3 | 6 | 3 | 9 | 78 | 10 | 300 |
| Comparative example 4 | 2 | 0.005 | 6 | 0.8 | 11.5 | 78 | 9 | 600 |
| Comparative example 5 | 2 | 0.008 | 5.8 | 0.82 | 11.3 | 80 | 9.2 | 580 |
| Comparative example 6 | 2 | 1.5 | 5.6 | 3.5 | 9.2 | 72 | 0.4 | 320 |

| No. | Positive electrode active material<br>Inner diameter of the secondary pore/μm | Inner diameter of the primary pore/μm | Porosity | Primary particle/nm | Dv50 of the secondary particles/μm | Secondary particle (Dv90 − Dv10)/Dv50 |
|---|---|---|---|---|---|---|
| Example 28 | 0.8 | 0.09 | 5% | 500 | 9 | 1.3 |
| Comparative example 4 | / | / | / | 500 | 9 | 1.2 |
| Comparative example 5 | 0.05 | 0.09 | 0.50% | 500 | 9 | 1.18 |
| Comparative example 6 | 3 | 0.09 | 15% | 500 | 9 | 1.09 |

TABLE 4-continued

| No. | Positive electrode active material Crystal plane area of the (010) crystal plane/μm$^2$ | Positive electrode sheet Thickness/μm | Battery Energy density/ (Wh/Kg) | Battery Discharge time/s | Battery Number of cycles/cycle |
|---|---|---|---|---|---|
| Example 28 | 270 | 300 | 501 | 80 | 460 |
| Comparative example 4 | 230 | 300 | 499 | 60 | 360 |
| Comparative example 5 | 232 | 300 | 499 | 65 | 380 |
| Comparative example 6 | 252 | 300 | 500 | 123 | 400 |

TABLE 5

| No. | Preparation parameters for the precursor of the positive electrode active material: Total molar concentration of metal ions in the mixed salt solution/(mol/L) | Molar concentration of the manganese element/(mol/L) | Molar concentration of the complexing agent/(mol/L) | Molar concentration of the precipitating agent/(mol/L) | Co-precipitation PH | Co-precipitation Temperature/° C. | Co-precipitation Time/h | Stirring speed/rpm |
|---|---|---|---|---|---|---|---|---|
| Example 29 | 2 | 0.3 | 6 | 3 | 9 | 79 | 10 | 300 |
| Comparative example 7 | 2 | 0.005 | 6 | 0.8 | 11.5 | 78 | 9 | 600 |

| No. | Positive electrode active material: Inner diameter of the secondary pore/μm | Inner diameter of the primary pore/μm | Porosity | Primary particle/nm | Dv50 of the secondary particles/μm | Secondary particle (Dv90 − Dv10)/Dv50 |
|---|---|---|---|---|---|---|
| Example 29 | 0.8 | / | 5% | 500 | 9 | 1.3 |
| Comparative example 7 | / | / | / | 500 | 9 | 1.2 |

| No. | Positive electrode active material Crystal plane area of the (010) crystal plane/μm$_2$ | Positive electrode sheet Thickness/μm | Battery Energy density/(Wh/Kg) | Battery Discharge time/s | Battery Number of cycles/cycle |
|---|---|---|---|---|---|
| Example 29 | 270 | 300 | 500 | 123 | 900 |
| Comparative example 7 | 230 | 300 | 499 | 90 | 600 |

TABLE 6

| No. | Preparation parameters for the precursor of the positive electrode active material: Total molar concentration of metal ions in the mixed salt solution/(mol/L) | Molar concentration of the manganese element/(mol/L) | Molar concentration of the complexing agent/(mol/L) | Molar concentration of the precipitating agent/(mol/L) | Co-precipitation PH | Co-precipitation Temperature/° C. | Co-precipitation Time/h | Stirring speed/rpm |
|---|---|---|---|---|---|---|---|---|
| Example 30 | 2 | 0.032 | 6 | 3 | 9 | 77 | 10 | 300 |
| Comparative example 8 | 2 | 0.0051 | 6 | 0.8 | 11.5 | 78 | 9 | 600 |

TABLE 6-continued

| No. | Positive electrode active material: Inner diameter of the secondary pore/μm | Inner diameter of the primary pore/μm | Porosity | Primary particle/nm | Dv50 of the secondary particles/μm | Secondary particle (Dv90 − Dv10)/Dv50 |
|---|---|---|---|---|---|---|
| Example 30 | 0.8 | / | 5% | 500 | 9 | 1.3 |
| Comparative example 8 | / | / | / | 500 | 9 | 1.2 |

| No. | Positive electrode active material Crystal plane area of the (010) crystal plane/μm$_2$ | Positive electrode sheet Thickness/μm | Battery: Energy density/ (Wh/Kg) | Discharge time/s | Number of cycles/cycle |
|---|---|---|---|---|---|
| Example 30 | 270 | 300 | 500 | 113 | 560 |
| Comparative example 8 | 230 | 300 | 499 | 85 | 550 |

From the above results, it is found that the positive electrode active materials in Examples 1 to 30 have the following general formula: $Li_aNi_xM1_yMn_zM2_{1-x-y-z}O_2$, where M1 and M2 each independently include one or a plurality of Co, Al, B, Zr, Sr, Y, Sb, W, Ti, Mg, or Nb, $0.8 \le a \le 1.2$, $0.55 \le x < 1$, $0 < y \le 0.25$, and $0 \le z \le 0.2$, the positive electrode active material is present in a form of secondary particles formed by aggregation of primary particles, the secondary particles include secondary pores formed by spaces between the primary particles, and the secondary pores have an inner diameter of 0.1 μm to 2 μm.

A morphological test of the positive electrode active material in Example 3 is performed using a scanning electron microscope SEM, and the test results are shown in FIG. 1, from which it can be seen that the secondary particles include the secondary pores formed by the spaces between the primary particles. The secondary particles of the positive electrode active materials in Examples 1 to 30 include the secondary pores formed by the spaces between the primary particles, and the secondary pores have an inner diameter of 0.1 μm to 2 μm.

From the comparison between Comparative example 1 and each of Examples 1 to 21 and Examples 24 to 27, between Example 28 and Comparative example 4, between Example 29 and Comparative example 7, and between Example 30 and Comparative example 8, it can be seen that the secondary particles of the positive electrode active material in the examples of the present application include the secondary pores formed by the spaces between the primary particles, which is advantageous to improve the energy density, the discharge time, and the cycle performance of the battery.

From the comparison between Examples 3 to 21 and Comparative examples 2 and 3, and between Example 28 and Comparative examples 5 and 6, it can be seen that the inner diameter of the secondary pore is controlled to be 0.1 μm to 2 μm in the examples of the present application, which is advantageous to further improve the energy density and the cycle performance of the battery. From the comparison between Example 2 and Examples 1 and 3 to 5 that, it can be seen that the inner diameter of the secondary pore in the positive electrode active material is further controlled to be 0.2 μm to 1 μm, which is advantageous to simultaneously consider the energy density, the discharge time, and the cycle performance of the battery.

From Examples 3 and 8 to 11, it can be seen that the porosity of the positive electrode active material is controlled to be 0.1% to 12% so that the battery has high energy density, long discharge time, and excellent cycle performance. From the comparison between Example 8 and Examples 3 and 9 to 11, it can be seen that further controlling the porosity of the positive electrode active material to be 0.1% to 10% is advantageous to further improve the energy density and the cycle performance of the battery.

From Examples 3 and 12 to 15, it can be seen that the average particle size D of the primary particles is controlled to be 100 nm to 800 nm so that the battery has high energy density, long discharge time, and excellent cycle performance. From the comparison of Examples 3 and 12 to 14 with Example 15, it can be seen that further controlling the average particle size D of the primary particles to be 100 nm to 500 nm is advantageous to further improve the energy density, the discharge time, and the cycle performance of the battery.

From Examples 3 and 16 to 19, it can be seen that the Dv50 of the secondary particles is controlled to be 3 μm to 12 μm so that the battery has high energy density, long discharge time, and excellent cycle performance. From the comparison between Example 19 and Examples 3 and 16 to 18, it can be seen that further controlling the Dv50 of the secondary particles to be 3 μm to 11 μm is advantageous to further improve the cycle performance of the battery.

From Examples 3 and 20 to 21, it can be seen that the SPAN value of the secondary particles is controlled to be 0.8 to 1.5 so that the battery has high energy density, long discharge time, and excellent cycle performance.

From Examples 3 and 22 to 23, it can be seen that the thickness of the positive electrode film layer is controlled to be 200 μm to 400 μm so that the battery has high energy density, long discharge time, and excellent cycle performance.

From the comparison between Example 3 and Example 1, it can be seen that the primary particles have primary pores, which are advantageous to improve the energy density, the discharge time, and the cycle performance of the battery. From Examples 3 and 24 to 27, it can be seen that the inner diameters of the primary pores of the primary particles is controlled to be 0.05 μm to 0.6 μm so that the battery has high energy density, long discharge time, and excellent cycle performance. From the comparison of Examples 3 and 25 to 26 with Examples 24 and 27, it can be seen that further controlling the inner diameters of the primary pores of the primary particles to be 0.08 μm to 0.2 μm is advantageous to further improve the energy density, the discharge time, and the cycle performance of the battery.

It should be noted that the present application is not limited to the above-described implementation. The above-described implementation is merely an example, and any implementation having substantially the same configuration as the technical concept and exhibiting the same operation and effect within the scope of the claims of the present application is included in the technical scope of the present application. In addition, various modifications that can be conceived by those skilled in the art may be made to the implementations without departing from the subject matter of the present application, and other implementations constructed by combining some of the constituent elements in the implementations are also included in the scope of the present application.

The invention claimed is:

1. A positive electrode active material, characterized in that the positive electrode active material has the following general formula:

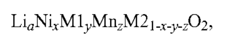

$Li_aNi_xM1_yMn_zM2_{1-x-y-z}O_2$, wherein M1 and M2 each independently comprise one or a plurality of Co, Al, B, Zr, Sr, Y, Sb, W, Ti, Mg, or Nb, $0.8 \le a \le 1.2$, $0.55 \le x < 1$, $0 < y \le 0.25$, and $0 \le z \le 0.2$;

the positive electrode active material is present in a form of secondary particles formed by aggregation of primary particles, the secondary particles comprise secondary pores formed by spaces between the primary particles, and the secondary pores have an inner diameter of 0.1 μm to 2 μm; and the primary particles have a substantially spherical shape, wherein at least some of the primary particles further comprise primary pores therein, and the primary pores have an inner diameter of 0.05 μm to 0.6 μm.

2. The positive electrode active material according to claim 1, wherein the ratio of the closest distance between the secondary pores and the surface of the secondary particles to the Dv50 of the secondary particles is 1/5 to 3/5.

3. The positive electrode active material according to claim 1, wherein $0.8 \le a \le 1.2$, $0.8 \le x < 1.0$, $0 < y \le 0.1$, and $0 \le z \le 0.1$.

4. The positive electrode active material according to claim 1, wherein the secondary pores have an inner diameter of 0.2 μm to 1 μm.

5. The positive electrode active material according to claim 1, wherein the porosity of the positive electrode active material is 0.1% to 12%.

6. The positive electrode active material according to claim 1, wherein the average particle size D of the primary particles is 100 nm to 800 nm.

7. The positive electrode active material according to claim 1, wherein the Dv50 of the secondary particles is 3 μm to 12 μm.

8. The positive electrode active material according to claim 1, wherein the SPAN value of the secondary particles is 0.8 to 1.5.

9. The positive electrode active material according to claim 1, wherein the area of a (010) crystal plane in an XRD diffraction spectrum of the positive electrode active material is 200 $\mu m^2$ to 300 $\mu m^2$.

10. A preparation method for a positive electrode active material, characterized by comprising:

mixing a first raw material comprising a nickel source and a manganese source with a complexing agent and a precipitating agent to perform a co-precipitation reaction to prepare a precursor, optionally, the first raw material further comprising an M1 source, wherein a reaction temperature of the co-precipitation reaction is 65° C. to 80° C.; and mixing the precursor with a lithium source for calcination to prepare the positive electrode active material; or mixing the precursor with a lithium source for calcination and then performing mixing with an M2 source for calcination to prepare the positive electrode active material, the positive electrode active material having the following general formula:

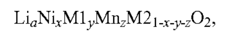

$Li_aNi_xM1_yMn_zM2_{1-x-y-z}O_2$, wherein M1 and M2 each independently comprise one or a plurality of Co, Al, B, Zr, Sr, Y, Sb, W, Ti, Mg, or Nb, $0.8 \le a \le 1.2$, $0.55 \le x < 1$, $0 < y \le 0.25$, and $0 \le z \le 0.2$, the positive electrode active material is present in a form of secondary particles formed by aggregation of primary particles, the secondary particles comprise secondary pores formed by spaces between the primary particles, the secondary pores have an inner diameter of 0.1 μm to 2 μm, and the primary particles have a substantially spherical shape, and wherein at least some of the primary particles further comprise primary pores therein, and the primary pores have an inner diameter of 0.05 μm to 0.6 μm.

11. The preparation method according to claim 10, wherein $0.8 \le a \le 1.2$, $0.8 \le x < 1.0$, $0 < y \le 0.1$, and $0 \le z \le 0.1$.

12. The preparation method according to claim 10, wherein the precursor is present in a form of secondary precursor particles formed by aggregation of primary precursor particles;

the average particle size D' of the primary precursor particles is 150 nm to 500 nm; and the median particle size Dv50' of the secondary precursor particles is 3 μm to 12 μm.

13. The preparation method according to claim 10, wherein the specific surface area of the precursor is 2 $m^2/g$ to 40 $m^2/g$.

14. The preparation method according to claim 13, wherein the molar concentration of the manganese element in the first raw material is 0.02 mol/L to 1.5 mol/L.

15. The preparation method according to claim 10, wherein the pH value of the co-precipitation reaction is 9 to 12.

16. The preparation method according to claim 10, wherein the reaction time of the co-precipitation reaction is 6 h to 10 h.

17. A positive electrode sheet, characterized by comprising a positive electrode current collector and a positive electrode film layer disposed on at least one surface of the positive electrode current collector, the positive electrode film layer comprising the positive electrode active material according to claim 1.

18. A secondary battery, characterized by comprising the positive electrode sheet according to claim 17.

19. The positive electrode active material according to claim 1, wherein M1 and M2 each independently comprise one or a plurality of Al, B, Zr, Sr, Y, Sb, W, Ti, Mg, or Nb.

* * * * *